US011963235B2

(12) United States Patent
Liu et al.

(10) Patent No.: US 11,963,235 B2
(45) Date of Patent: *Apr. 16, 2024

(54) METHOD AND DEVICE IN A NODE USED FOR WIRELESS COMMUNICATION

(71) Applicant: Dido Wireless Innovations, LLC, Frisco, TX (US)

(72) Inventors: Jin Liu, Shanghai (CN); Xiaobo Zhang, Shanghai (CN)

(73) Assignee: Dido Wireless Innovations LLC, Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,648

(22) Filed: Nov. 30, 2022

(65) Prior Publication Data

US 2023/0089277 A1 Mar. 23, 2023

Related U.S. Application Data

(63) Continuation of application No. 16/824,719, filed on Mar. 20, 2020, now Pat. No. 11,576,209.

(30) Foreign Application Priority Data

Mar. 22, 2019 (CN) .......................... 201910223828.6

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0005* (2013.01); *H04W 72/0446* (2013.01); *H04W 74/002* (2013.01); *H04W 74/0866* (2013.01)

(58) Field of Classification Search
CPC ... H04L 5/0005; H04L 1/1614; H04L 1/1896; H04L 1/1607; H04L 1/1861;
(Continued)

(56) References Cited

U.S. PATENT DOCUMENTS 11,432,324 B2 *  8/2022  Lei .................... H04L 5/0051
11,576,209 B2 *  2/2023  Liu .................. H04W 74/0866
(Continued)

FOREIGN PATENT DOCUMENTS

WO    WO-2015063593 A2 *  5/2015  .......... H04L 5/0053
WO    WO-2020149660 A1 *  7/2020  .......... H04L 1/0013
(Continued)

OTHER PUBLICATIONS

U.S. Appl. No. 62/716,956 (Year: 2018).*

*Primary Examiner* — Rina C Pancholi

(57) ABSTRACT

A method and a device in a node used for wireless communication are disclosed in the present disclosure. A first node transmits a first sequence and a first radio signal, the first sequence being associated with the first radio signal, the first sequence being transmitted on a first random-access channel, and a first bit block being used for generating the first radio signal; receives a second radio signal, the second radio signal comprising a first information block; and transmits a second sequence and a third radio signal, the second sequence being associated with the third radio signal, and the second sequence being transmitted on a second random-access channel, the first bit block being used for generating the third radio signal; the first information block comprises a first sequence index, the first sequence index corresponds to the first sequence.

20 Claims, 14 Drawing Sheets

(51) Int. Cl.
*H04W 72/0446* (2023.01)
*H04W 74/00* (2009.01)
*H04W 74/0833* (2024.01)

(58) Field of Classification Search
CPC ......... H04W 74/0833; H04W 72/0446; H04W 74/002; H04W 74/0866
See application file for complete search history.

(56) References Cited

U.S. PATENT DOCUMENTS

| | | | |
|---|---|---|---|
| 2009/0238126 A1* | 9/2009 | Sato | H04W 56/0015 370/329 |
| 2015/0296542 A1* | 10/2015 | Heo | H04W 74/0833 370/329 |
| 2016/0309518 A1* | 10/2016 | Patel | H04W 74/0891 |
| 2018/0109976 A1* | 4/2018 | Ly | H04L 1/08 |
| 2020/0146069 A1* | 5/2020 | Chen | H04B 17/327 |
| 2020/0252973 A1* | 8/2020 | Zhang | H04W 74/0833 |
| 2020/0260500 A1* | 8/2020 | Agiwal | H04W 74/006 |
| 2021/0329704 A1* | 10/2021 | Yang | H04W 72/23 |
| 2022/0039175 A1* | 2/2022 | Zhou | H04W 74/006 |
| 2022/0191935 A1* | 6/2022 | Xiong | H04W 16/14 |

FOREIGN PATENT DOCUMENTS

| | | | | |
|---|---|---|---|---|
| WO | WO-2020197187 A1 | * | 10/2020 | |
| WO | WO-2021066277 A1 | * | 4/2021 | ........ H04W 72/1268 |

* cited by examiner

METHOD AND DEVICE IN A NODE USED FOR WIRELESS COMMUNICATION

CROSS-REFERENCE TO RELATED APPLICATION

This application is the continuation of the United States patent application U.S. Ser. No. 16/824,719, filed on Mar. 20, 2020, which claims the priority benefit of Chinese Patent Application No. 201910223828.6, filed on Mar. 22, 2019, the full disclosure of which is incorporated herein by reference.

BACKGROUND

Technical Field

The present disclosure relates to transmission methods and devices in wireless communication systems, and in particular to a transmission scheme and device of random access in wireless communications.

Related Art

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary session decided to conduct the study of New Radio (NR), or what is called fifth Generation (5G). The work Item (WI) of NR was approved at the 3GPP RAN #75 plenary session to standardize the NR.

To adapt to a variety of application scenarios and meet different requirements, a study item (SI) of NR Non-orthogonal Multiple Access (NoMA) was also approved at the 3GPP RAN #76th plenary session. The SI was started from Release 16 and soon after its completion a WI was initiated to standardize relevant techniques. Following the NoMA SI, the WI of 2-step Random Access (2-step RACH) under NR was approved at the 3GPP RAN #82 plenary session.

SUMMARY

For a User Equipment (UE) in Release 16 and UEs of updated versions, both the 2-step Random Access process and the 4-step Random Access (4-step RACH) process are applicable. Compared with the traditional 4-step RACH, which includes interactions of message 1 (Msg1), message 2 (Msg2), message 3 (Msg3) and message 4 (Msg4), the 2-step RACH includes only an interaction between message A (Msg A) and message B (Msg B), so employing the 2-step RACH will significantly shorten random access latency and reduce signaling overhead. What differentiates the 2-step RACH from the 4-step RACH is that Mag A in the 2-step RACH comprises a RACH preamble and a data signal transmission on PUSCH. There may be a situation where a preamble is detected but data signal on the PUSCH is not correctly decoded. To address such issue, an illustrative solution is to roll back to 4-step RACH mechanism so as to enable a base station to send Msg A to the UE.

Unfortunately, the solution does not apply to semi-statically conversion between the 4-step RACH mode and the 2-step RACH mode, or a UE that only supports the working mode of 2-step RACH. Therefore, the present disclosure provides a solution of double type Msg B: when the base station detects a preamble and correctly decoded data on PUSCH, a Msg B of type I (including random access response and conflict resolution) will be sent out; when the base station detects a preamble, but fails to decode the data on PUSCH correctly, a Msg B of type II (that is, a physical layer signaling) will be sent out. After receiving the Msg B of type II, the UE performs a retransmission of Msg A, and meanwhile adjusts transmission parameters of Msg A retransmission in accordance with previous information contained by the type II Msg B to ensure better matching with channel conditions. It should be noted that embodiments in the base station and characteristics of the embodiments may be applied to the UE in the present disclosure if there is no conflict. Further, the embodiments of the present disclosure and the characteristics in the embodiments may be mutually combined when no conflict is incurred.

The present disclosure provides a method in a first node used for wireless communication, comprising:

transmitting a first sequence and a first radio signal, the first sequence being associated with the first radio signal, the first sequence being transmitted on a first random-access channel, and a first bit block being used for generating the first radio signal;

receiving a second radio signal, the second radio signal comprising a first information block; and transmitting a second sequence and a third radio signal, the second sequence being associated with the third radio signal, the second sequence being transmitted on a second random-access channel, and the first bit block being used for generating the third radio signal;

herein, the first radio signal is used for carrying a first identification; the first information block is used for triggering a transmission of the third radio signal; the first information block comprises a first sequence index, the first sequence index corresponds to the first sequence; the first information block is used for determining transmission parameters of the third radio signal.

In one embodiment, the first node determines by receiving the first information block that the first sequence is detected, and that the first radio signal is not correctly received.

In one embodiment, the first node determines that the first bit block comprised in the first radio signal is not correctly decoded through the first response signaling out of Q first-type response signaling(s) comprised in the first information block.

In one embodiment, an advantage of the above method is that since the first information block is received by the first node, when retransmitting the first bit block, more appropriate radio signal transmission parameters can be employed by the first node to enhance the success rate of access.

According to one aspect of the present disclosure, the above method is characterized in that the first information block comprises Q first-type response signaling(s), a first response signaling is one of the Q first-type response signaling(s), the first response signaling corresponds to the first sequence, and the first response signaling is used for determining that the first bit block is not correctly decoded, Q is a positive integer.

According to one aspect of the present disclosure, the above method is characterized in that the first information block comprises a first target signaling, the first target signaling corresponds to the first sequence, the first target signaling is used for determining that the first bit block is not correctly decoded, a target receiver of the first information block is the first node.

According to one aspect of the present disclosure, the above method is characterized in comprising:

performing a first blind detection and a second blind detection respectively on a first candidate channel and a second candidate channel;

herein, the first radio signal is used for triggering the first blind detection and the second blind detection; the second radio signal is detected on the first candidate channel.

According to one aspect of the present disclosure, the above method is characterized in comprising:

receiving a first signaling in a first time window;

herein, a time domain resource unit occupied by the first candidate channel and a time domain resource unit occupied by the second candidate channel both belong to the first time window; at least one of a time-frequency resource unit occupied by the first sequence and a time-frequency resource unit occupied by the first radio signal is used for determining the first time window; the first signaling is used for determining scheduling information of the second radio signal.

According to one aspect of the present disclosure, the above method is characterized in that the first node is a UE.

According to one aspect of the present disclosure, the above method is characterized in that the first node is a relay node.

The present disclosure provides a method in a second node used for wireless communication, comprising:

receiving a first sequence and a first radio signal, the first sequence being associated with the first radio signal, the first sequence being transmitted on a first random-access channel, and a first bit block being used for generating the first radio signal;

transmitting a second radio signal, the second radio signal comprising a first information block; and receiving a second sequence and a third radio signal, the second sequence being associated with the third radio signal, the second sequence being transmitted on a second random-access channel, and the first bit block being used for generating the third radio signal;

herein the first radio signal is used for carrying a first identification; the first information block is used for triggering a transmission of the third radio signal; the first information block comprises a first sequence index, the first sequence index corresponds to the first sequence; the first information block is used for determining transmission parameters of the third radio signal.

According to one aspect of the present disclosure, the above method is characterized in that the first information block comprises Q first-type response signaling(s), a first response signaling is one of the Q first-type response signaling(s), the first response signaling corresponds to the first sequence, and the first response signaling is used for determining that the first bit block is not correctly decoded, Q is a positive integer.

According to one aspect of the present disclosure, the above method is characterized in that the first information block comprises a first target signaling, the first target signaling corresponds to the first sequence, the first target signaling is used for determining that the first bit block is not correctly decoded, a target receiver of the first information block is the first node.

According to one aspect of the present disclosure, the above method is characterized in comprising:

determining the first candidate channel out of a first candidate channel and a second candidate channel;

herein, a result of detection of the first radio signal is used for determining the first candidate channel; the second radio signal is transmitted on the first candidate channel.

According to one aspect of the present disclosure, the above method is characterized in comprising:

transmitting a first signaling in first time window;

herein, a time domain resource unit occupied by the first candidate channel and a time domain resource unit occupied by the second candidate channel both belong to the first time window; at least one of a time-frequency resource unit occupied by the first sequence and a time-frequency resource unit occupied by the first radio signal is used for determining the first time window; the first signaling is used for determining scheduling information of the second radio signal.

According to one aspect of the present disclosure, the above method is characterized in that the second node is a base station.

According to one aspect of the present disclosure, the above method is characterized in that the second node is a relay node.

The present disclosure provides a first node used for wireless communication, comprising:

a first transmitter, which transmits a first sequence and a first radio signal, the first sequence being associated with the first radio signal, the first sequence being transmitted on a first random-access channel, and a first bit block being use for generating the first radio signal;

a first receiver, which receives a second radio signal, the second radio signal comprising a first information block; and a second transmitter, which transmits a second sequence and a third radio signal, the second sequence being associated with the third radio signal, the second sequence being transmitted on a second random-access channel, and the first bit block being used for generating the third radio signal;

herein, the first radio signal is used for carrying a first identification; the first information block is used for triggering a transmission of the third radio signal; the first information block comprises a first sequence index, the first sequence index corresponds to the first sequence; the first information block is used for determining transmission parameters of the third radio signal.

The present disclosure provides a second node used for wireless communication, comprising:

a second receiver, which receives a first sequence and a first radio signal, the first sequence being associated with the first radio signal, the first sequence being transmitted on a first random-access channel, and a first bit block being used for generating the first radio signal;

a third transmitter, which transmits a second radio signal, the second radio signal comprising a first information block; and a third receiver, which receives a second sequence and a third radio signal, the second sequence being associated with the third radio signal, the second sequence being transmitted on a second random-access channel, and the first bit block being used for generating the third radio signal;

herein, the first radio signal is used for carrying a first identification; the first information block is used for triggering a transmission of the third radio signal; the first information block comprises a first sequence index, the first sequence index corresponds to the first sequence; the first information block is used for determining transmission parameters of the third radio signal.

In one embodiment, the present disclosure is advantageous in the following aspects:

The present disclosure determines by receiving of the first information block that the first sequence is detected and that the first radio signal is not correctly received.

The present disclosure determines that the first bit block comprised in the first radio signal is not correctly decoded by receiving of the first response signaling of the Q first-type response signaling(s) comprised in the first information block.

The present disclosure ensures that since the first information block is received through the first node, when the first bit block is retransmitted, the first node is able to employ more precise radio signal transmission parameters, so as to enhance the rate of successful accessing.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
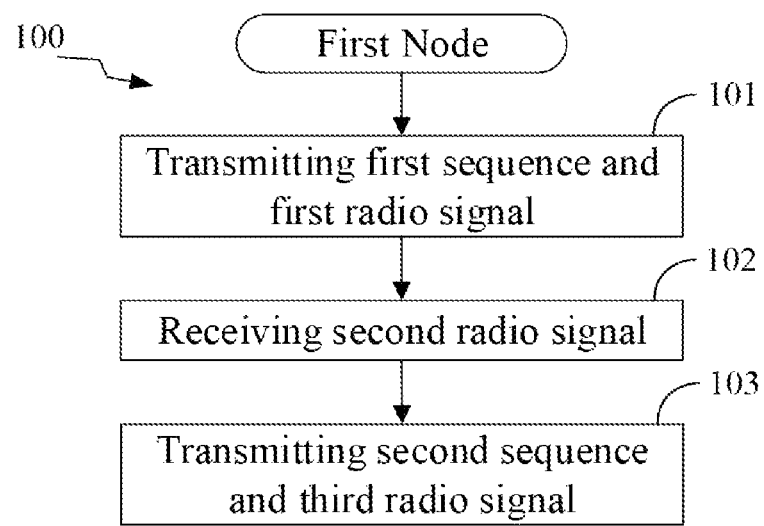
FIG. 1 illustrates a flowchart of processing of a first node according to one embodiment of the present disclosure.

Embodiment 1 illustrates a flowchart of processing of a first node according to one embodiment of the present disclosure, as shown in FIG. 1. In process 100 illustrated by FIG. 1, each box represents a step. In Embodiment 1, the first node in the present disclosure first takes step 101 to transmit a first sequence and a first radio signal; and then takes step 102 to receive a second radio signal; and finally takes step 103 to transmit a second sequence and a third radio signal; the first sequence is associated with the first radio signal; the first sequence is transmitted on a first random-access channel, and a first bit block is used for generating the first radio signal; the second radio signal comprises a first information block; and the second sequence is associated with the third radio signal, the second sequence is transmitted on a second random-access channel, and the first bit block is used for generating the third radio signal; the first radio signal is used for carrying a first identification; the first information block is used for triggering a transmission of the third radio signal; the first information block comprises a first sequence index, the first sequence index corresponds to the first sequence; the first information block is used for determining transmission parameters of the third radio signal.

In one embodiment, the first sequence and the second sequence are both pseudo random sequences.

In one embodiment, the first sequence and the second sequence are both Gold sequences.

In one embodiment, the first sequence and the second sequence are both M-sequences.

In one embodiment, the first sequence and the second sequence are both Zadeoff-Chu sequences.

In one embodiment, the first sequence and the second sequence are both Random-Access Preambles.

In one embodiment, the generation modes of the first sequence and the second sequence can be found in 3GPP TS38.211, section 6.3.3.1.

In one embodiment, any of a subcarrier spacing (SCS) of subcarriers occupied by the first sequence and an SCS of subcarriers occupied by the second sequence in frequency domain is one of 1.25 kHz, 5 kHz, 15 kHz, 30 kHz, 60 kHz and 120 kHz.

In one embodiment, the first sequence comprises $L_1$ elements, any of the $L_1$ elements is a plural, and $L_1$ is a positive integer.

In one embodiment, the sequence length of the first sequence is the $L_1$.

In one embodiment, the $L_1$ is 839.

In one embodiment, the $L_1$ is 139.

In one embodiment, the sequence length of the first sequence is 839, which means that the first sequence comprises 839 elements.

In one embodiment, the sequence length of the first sequence is 839, which means that the SCS of subcarriers occupied by the first sequence is 1.25 kHz.

In one embodiment, the sequence length of the first sequence is 839, which means that the SCS of subcarriers occupied by the first sequence is 5 kHz.

In one embodiment, the sequence length of the first sequence is 139, which means that the first sequence comprises 139 elements.

In one embodiment, the sequence length of the first sequence is 139, which means that the SCS of subcarriers occupied by the first sequence is 15 kHz.

In one embodiment, the sequence length of the first sequence is 139, which means that the SCS of subcarriers occupied by the first sequence is 30 kHz.

In one embodiment, the sequence length of the first sequence is 139, which means that the SCS of subcarriers occupied by the first sequence is 60 kHz.

In one embodiment, the sequence length of the first sequence is 139, which means that the SCS of subcarriers occupied by the first sequence is 120 kHz.

In one embodiment, the second sequence comprises $L_2$ elements, any of the $L_2$ elements is a plural, and $L_2$ is a positive integer.

In one embodiment, the sequence length of the second sequence is the $L_2$.

In one embodiment, the $L_2$ is 839.

In one embodiment, the $L_2$ is 139.

In one embodiment, the sequence length of the second sequence is 839, which means that the second sequence comprises 839 elements.

In one embodiment, the sequence length of the second sequence is 839, which means that the SCS of subcarriers occupied by the second sequence is 1.25 kHz.

In one embodiment, the sequence length of the second sequence is 839, which means that the SCS of subcarriers occupied by the second sequence is 5 kHz.

In one embodiment, the sequence length of the second sequence is 139, which means that the second sequence comprises 139 elements.

In one embodiment, the sequence length of the second sequence is 139, which means that the SCS of subcarriers occupied by the second sequence is 15 kHz.

In one embodiment, the sequence length of the second sequence is 139, which means that the SCS of subcarriers occupied by the second sequence is 30 kHz.

In one embodiment, the sequence length of the second sequence is 139, which means that the SCS of subcarriers occupied by the second sequence is 60 kHz.

In one embodiment, the sequence length of the second sequence is 139, which means that the SCS of subcarriers occupied by the second sequence is 120 kHz.

In one embodiment, the first sequence is different from the second sequence.

In one embodiment, a sequence in the first sequence is different from a sequence of the second sequence.

In one embodiment, a sequence length of the first sequence is different from a sequence length of the second sequence.

In one embodiment, the first sequence is the same as the second sequence.

In one embodiment, a sequence in the first sequence is the same as a sequence in the second sequence.

In one embodiment, a sequence length of the first sequence is the same as a sequence length of the second sequence.

In one embodiment, the first sequence and the second sequence are transmitted respectively on a first random-access channel and a second random-access channel.

In one embodiment, both of the first random-access channel and the second random-related channel are Random Access Channels (RACHs).

In one embodiment, both of the first random-access channel and the second random-related channel are Physical Random Access Channels (PRACHs).

In one embodiment, both of the first random-access channel and the second random-related channel are Narrowband Physical Random Access Channels (NPRACHs).

In one embodiment, both of the first random-access channel and the second random-related channel are Physical Sidelink Random Access Channel (PSRACH).

In one embodiment, the first random-access channel comprises a RACH Occasion.

In one embodiment, the second random-access channel comprises a RACH Occasion.

In one embodiment, the first random-access channel is a RACH Occasion.

In one embodiment, the second random-access channel is a RACH Occasion.

In one embodiment, the RACH Occasion is a PRACH Occasion.

In one embodiment, the RACH Occasion is a NPRACH Occasion.

In one embodiment, the RACH Occasion is a PSRACH Occasion.

In one embodiment, the first random-access channel occupies at least one time-frequency resource unit.

In one embodiment, the second random-access channel occupies at least one time-frequency resource unit.

In one embodiment, the first random-access channel occupies one time-frequency resource unit.

In one embodiment, the second random-access channel occupies one time-frequency resource unit.

In one embodiment, the first random-access channel and the second random-access channel are respectively two different RACH Occasions.

In one embodiment, a RACH Occasion where the first random-access channel is located and a RACH Occasion where the second random-access channel is located are difference from each other.

In one embodiment, a RACH Occasion where the first random-access channel is located is earlier than a RACH Occasion where the second random-access channel is located.

In one embodiment, the first random-access channel and the second random-access channel respectively occupy two different time-frequency resource units.

In one embodiment, a time-frequency resource unit occupied by the first random-access channel is different from a time-frequency resource unit occupied by the second random-access channel.

In one embodiment, a time-frequency resource unit occupied by the first random-access channel is earlier than a time-frequency resource unit occupied by the second random-access channel.

In one embodiment, the first sequence is subjected to Discrete Fourier Transform (DFT) and then to Orthogonal Frequency Division Multiplexing (OFDM) before being transmitted on the first random-access channel.

In one embodiment, the second sequence is subjected to DFT and then to OFDM before being transmitted on the second random-access channel.

In one embodiment, the first sequence is sequentially subjected to Sequence Generation, DFT, Modulation and Resource Element Mapping, and Broadband Symbol Generation to generate a first characteristic radio signal.

In one embodiment, the second sequence is sequentially subjected to Sequence Generation, DFT, Modulation and Resource Element Mapping, and Broadband Symbol Generation to generate a second characteristic radio signal.

In one embodiment, the first characteristic radio signal is transmitted on the first random-access channel.

In one embodiment, the second characteristic radio signal is transmitted on the second random-access channel.

In one embodiment, the first characteristic radio signal comprises a positive integer number of first-type sequences, the first sequence is one of the positive integer number of first-type sequences, and the sequence length of any one of the positive integer number of first-type sequences is 139. Each of the positive integer number of first-type sequences in the first characteristic radio signal is Time-Division Multiplexing (TDM).

In one embodiment, the second characteristic radio signal comprises a positive integer number of second-type sequences, the second sequence is one of the positive integer number of second-type sequences, and the sequence length of any one of the positive integer number of second-type sequences is 139. Each of the positive integer number of second-type sequences in the second characteristic radio signal is TDM.

In one embodiment, any two of the positive integer number of first-type sequences in the first characteristic radio signal are the same.

In one embodiment, any two of the positive integer number of second-type sequences in the second characteristic radio signal are the same.

In one embodiment, at least two first-type sequences of the positive integer number of first-type sequences in the first characteristic radio signal are different.

In one embodiment, at least two second-type sequences of the positive integer number of second-type sequences in the second characteristic radio signal are different.

In one embodiment, any two neighboring first-type sequences of the positive integer number of first-type sequences in the first characteristic radio signal are spaced by a Cyclic Prefix (CP).

In one embodiment, any two neighboring second-type sequences of the positive integer number of second-type sequences in the second characteristic radio signal are spaced by a CP.

In one embodiment, the first sequence and the second sequence are cell-specific.

In one embodiment, the first sequence and the second sequence are UE-specific.

In one embodiment, the first sequence is cell-specific, while the second sequence is UE-specific.

In one embodiment, the first sequence and the second sequence are broadcast.

In one embodiment, the first sequence and the second sequence are groupcast.

In one embodiment, the first sequence and the second sequence are unicast.

In one embodiment, the first sequence is broadcast, while the second sequence is groupcast.

In one embodiment, the first sequence is broadcast, while the second sequence is unicast.

In one embodiment, the first sequence is groupcast, while the second sequence is unicast.

In one embodiment, both the first sequence and the second sequence are transmitted on unlicensed spectrum.

In one embodiment, the first radio signal and the third radio signal are both transmitted on an Uplink Shared Channel (UL-SCH).

In one embodiment, the first radio signal is transmitted on a Physical Uplink Shared Channel (PUSCH).

In one embodiment, the first radio signal is transmitted on a Physical Uplink Control Channel (PUCCH).

In one embodiment, the third radio signal is transmitted on a PUSCH.

In one embodiment, the third radio signal is transmitted on a PUCCH.

In one embodiment, both the first radio signal and the third radio signal are transmitted on a PUSCH.

In one embodiment, both the first radio signal and the third radio signal are transmitted on a PUCCH.

In one embodiment, both the first radio signal and the third radio signal are transmitted on a Physical Sidelink Shared Channel (PSSCH).

In one embodiment, both the first radio signal and the third radio signal are transmitted on a Physical Sidelink Control Channel (PSCCH).

In one embodiment, the first radio signal is transmitted on a PUCCH and a PUSCH.

In one embodiment, the first radio signal is transmitted on a PSCCH and a PSSCH.

In one embodiment, the third radio signal is transmitted on a PUCCH and a PUSCH.

In one embodiment, the third radio signal is transmitted on a PSCCH and a PSSCH.

In one embodiment, the first sequence and the first radio signal are respectively transmitted on a PRACH and a PUSCH.

In one embodiment, the second sequence and the third radio signal are respectively transmitted on a PRACH and a PUSCH.

In one embodiment, the first radio signal and the third radio signal are both cell-specific.

In one embodiment, the first radio signal and the third radio signal are both UE-specific.

In one embodiment, the first radio signal is cell-specific, while the third radio signal is UE-specific.

In one embodiment, the first radio signal and the third radio signal are transmitted via broadcast.

In one embodiment, the first radio signal and the third radio signal are transmitted via groupcast.

In one embodiment, the first radio signal and the third radio signal are transmitted via unicast.

In one embodiment, the first radio signal and the third radio signal are transmitted on licensed spectrum.

In one embodiment, the first radio signal and the third radio signal are transmitted on unlicensed spectrum.

In one embodiment, the first radio signal is broadcast, while the third radio signal is unicast.

In one embodiment, the first radio signal is broadcast, while the third radio signal is groupcast.

In one embodiment, the first radio signal is groupcast, while the third radio signal is unicast.

In one embodiment, the first radio signal comprises all or part of a higher layer signaling.

In one embodiment, the third radio signal comprises all or part of a higher layer signaling.

In one embodiment, the first radio signal comprises all or part of a Radio Resource Control (RRC) layer signaling.

In one embodiment, the third radio signal comprises all or part of an RRC layer signaling.

In one embodiment, the first radio signal comprises one or more fields of an RRC Information Element (IE).

In one embodiment, the third radio signal comprises one or more fields of an RRC IE.

In one embodiment, the first radio signal comprises all or part of a Multimedia Access Control (MAC) layer signaling.

In one embodiment, the first radio signal comprises all or part of a MAC layer signaling.

In one embodiment, the first radio signal comprises one or more fields of a MAC Control Element (CE).

In one embodiment, the third radio signal comprises one or more fields of a MAC CE.

In one embodiment, the first radio signal comprises one or more fields of a physical (PHY) layer.

In one embodiment, the third radio signal comprises one or more fields of a PHY layer.

In one embodiment, the first radio signal comprises one or more fields of first Uplink Control Information (UCI).

In one embodiment, the third radio signal comprises one or more fields of second UCI.

In one embodiment, the first UCI is different from the second UCI.

In one embodiment, a time-frequency resource unit indicated by the first UCI is different from a time-frequency resource unit indicated by the second UCI.

In one embodiment, the first radio signal does not comprise the first UCI.

In one embodiment, the third radio signal does not comprise the second UCI.

In one embodiment, the first radio signal comprises one or more fields of a Master Information Block-V2X-Sidelink (MIB-V2X-SL).

In one embodiment, the third radio signal comprises one or more fields of a MIB-V2X-SL.

In one embodiment, the first radio signal comprises one or more fields of a piece of first Sidelink Control Information (SCI).

In one embodiment, the third radio signal comprises one or more fields of a piece of second SCI.

In one embodiment, the first radio signal comprises a first Demodulation Reference Signal (DMRS).

In one embodiment, the third radio signal comprises a third DMRS.

In one embodiment, the first DMRS is the same as the third DMRS.

In one embodiment, the first DMRS is different from the third DMRS.

In one embodiment, the first DMRS is used for demodulation of the first radio signal.

In one embodiment, the third DMRS is used for demodulation of the third radio signal.

In one embodiment, parameters of a channel which the first DMRS goes through are related to parameters of a channel which the first radio signal goes through.

In one embodiment, parameters of a channel which the third DMRS goes through are related to parameters of a channel which the third radio signal goes through.

In one embodiment, the first radio signal does not comprise the first DMRS.

In one embodiment, the third radio signal does not comprise the third DMRS.

In one embodiment, the third radio signal is a retransmission of the first radio signal.

In one embodiment, the third radio signal is a repetition of the first radio signal.

In one embodiment, the third radio signal is exactly the same as the first radio signal.

In one embodiment, the third radio signal is partially the same as the first radio signal.

In one embodiment, a first bit block is used for generating the first radio signal, the first bit block is used for generating the third radio signal, and the first bit block comprises a positive integer number of sequentially arranged bits.

In one embodiment, the first radio signal comprises the first bit block, and the third radio signal comprises the first bit block, wherein the first bit block comprises a positive integer number of sequentially arranged bits.

In one embodiment, all bits in the first bit block are used for generating the first radio signal; a part of bits in the first bit block are used for generating the third radio signal.

In one embodiment, the first bit block comprises a positive integer number of Code Blocks (CBs).

In one embodiment, the first bit block comprises a positive integer number of Code Block Groups (CBGs).

In one embodiment, the first bit block comprises one Transport Block (TB).

In one embodiment, the first bit block is obtained after a TB is subjected to TB-level Cyclic Redundancy Check (CRC) Attachment.

In one embodiment, the first bit block is one of CBs obtained after a TB is subjected to TB-level CRC Attachment, Code Block Segmentation and CB-level CRC Attachment in sequence.

In one embodiment, the first radio signal is generated after all or part of bits in the first bit block are sequentially subjected to TB-level CRC Attachment, Code Block Segmentation, CB-level CRC Attachment, Channel Coding, Rate Matching, Code Block Concatenation, scrambling, Modulation, Layer Mapping, Antenna Port Mapping, Mapping to Physical Resource Blocks, Baseband Signal Generation, and Modulation and Upconversion.

In one embodiment, the first radio signal is an output after the first bit block is sequentially subjected to Modulation Mapper, Layer Mapper, Precoding, Resource Element Mapper and Multicarrier Symbol Generation.

In one embodiment, the third radio signal is generated after all or part of bits in the first bit block are sequentially subjected to TB-level CRC Attachment, Code Block Segmentation, CB-level CRC Attachment, Channel Coding, Rate Matching, Code Block Concatenation, scrambling, Modulation, Layer Mapping, Antenna Port Mapping, Mapping to Physical Resource Blocks, Baseband Signal Generation, and Modulation and Upconversion.

In one embodiment, the third radio signal is an output after the first bit block is sequentially subjected to Modulation Mapper, Layer Mapper, Precoding, Resource Element Mapper and Multicarrier Symbol Generation.

In one embodiment, the channel coding is based on a polar code.

In one embodiment, the channel coding is based on a Low-density Parity-Check (LDPC) code.

In one embodiment, only the first bit block is used for generating the first radio signal.

In one embodiment, bit block(s) other than the first bit block is(are) also used for generating the first radio signal.

In one embodiment, only the first bit block is used for generating the third radio signal.

In one embodiment, bit block(s) other than the first bit block is(are) also used for generating the third radio signal.

In one embodiment, the SCS of subcarriers occupied by the first radio signal in frequency domain is one of 15 kHz, 30 kHz, 60 kHz, 120 kHz, 240 kHz, 480 kHz and 960 kHz.

In one embodiment, the SCS of subcarriers occupied by the third radio signal in frequency domain is one of 15 kHz, 30 kHz, 60 kHz, 120 kHz, 240 kHz, 480 kHz and 960 kHz.

In one embodiment, the SCS of subcarriers occupied by the first radio signal in frequency domain is the same as the SCS of subcarriers occupied by the third radio signal in frequency domain.

In one embodiment, the SCS of subcarriers occupied by the first radio signal in frequency domain is different from the SCS of subcarriers occupied by the third radio signal in frequency domain.

In one embodiment, the number of multicarrier symbols comprised by the first radio signal in time domain is one of 1, 2, 3, 4, 5, 6, 7, 11, 12, 13 and 14.

In one embodiment, the number of multicarrier symbols comprised by the third radio signal in time domain is one of 1, 2, 3, 4, 5, 6, 7, 11, 12, 13 and 14.

In one embodiment, the number of multicarrier symbols comprised by the first radio signal in time domain is equal to the number of multicarrier symbols comprised by the third radio signal in time domain.

In one embodiment, the number of multicarrier symbols comprised by the first radio signal in time domain is unequal to the number of multicarrier symbols comprised by the third radio signal in time domain.

In one embodiment, the multicarrier symbol is an Orthogonal Frequency Division Multiplexing (OFDM) symbol.

In one embodiment, the multicarrier symbol is a Discrete Fourier Transform Spread Frequency Division Multiplexing (DFT-s-OFDM) symbol.

In one embodiment, the multicarrier symbol is a Single Carrier Frequency Division Multiplexing Access (SC-FDMA).

In one embodiment, the multicarrier symbol is a Filter Bank Multi-Carrier (FBMC).

In one embodiment, the first sequence and the first radio signal are TDM.

In one embodiment, the first characteristic radio signal and the first radio signal are TDM.

In one embodiment, a first characteristic sequence group comprises a positive integer number of characteristic sequences, the first characteristic sequence group corresponds to the first random-access channel, the first sequence is one of the positive integer number of characteristic sequences in the first characteristic sequence group.

In one embodiment, any characteristic sequence in the first characteristic sequence group is transmitted on the first random-access channel.

In one embodiment, for the first random-access channel, only one characteristic sequence can be selected from the first characteristic sequence group for transmission.

In one embodiment, the first radio signal is used for determining the first sequence out of the first characteristic sequence group.

In one embodiment, a payload size of the first radio signal is used for determining the first sequence out of the first characteristic sequence group.

In one embodiment, a number of bits comprised in the first bit block is used for determining the first sequence out of the first characteristic sequence group.

In one embodiment, a time-frequency resource unit occupied by the first radio signal is used for determining the first sequence.

In one embodiment, the first sequence is used for determining a time-frequency resource unit occupied by the first radio signal.

In one embodiment, the first sequence is used for determining a frequency domain resource unit occupied by the first radio signal.

In one embodiment, the first sequence is used for determining a time domain resource unit occupied by the first radio signal and a frequency domain resource unit occupied by the first radio signal.

In one embodiment, a time-frequency resource unit occupied by the first sequence is associated with a time-frequency resource unit occupied by the first radio signal.

In one embodiment, a time domain resource unit occupied by the first sequence is associated with a time domain resource unit occupied by the first radio signal.

In one embodiment, a frequency domain resource unit occupied by the first sequence is associated with a frequency domain resource unit occupied by the first radio signal.

In one embodiment, a time-frequency resource unit occupied by the first radio signal is used for determining a time-frequency resource unit occupied by the first sequence.

In one embodiment, a time-frequency resource unit occupied by the first sequence is used for determining a time-frequency resource unit occupied by the first radio signal.

In one embodiment, a time domain resource unit occupied by the first sequence and a time domain resource unit occupied by the first radio signal are differentiated by a first time offset.

In one embodiment, the first time offset comprises a positive integer number of subframe(s).

In one embodiment, the first time offset comprises a positive integer number of slot(s).

In one embodiment, the first time offset comprises a positive integer number of multicarrier symbol(s).

In one embodiment, the first time offset is a constant.

In one embodiment, the first time offset is pre-defined.

In one embodiment, the first time offset is configurable.

In one embodiment, a frequency domain resource unit occupied by the first sequence and a frequency domain resource unit occupied by the first radio signal are differentiated by a first frequency offset.

In one embodiment, a starting frequency domain resource unit of frequency domain resource units occupied by the first sequence and a starting frequency domain resource unit of frequency domain resource units occupied by the first radio signal are spaced apart by the first frequency offset.

In one embodiment, a lowest subcarrier in a frequency domain resource unit occupied by the first sequence and a lowest subcarrier in a frequency domain resource unit occupied by the first radio signal are spaced apart by the first frequency offset.

In one embodiment, the first frequency offset comprises a positive integer number of Resource Block(s) (RB).

In one embodiment, the first frequency offset comprises a positive integer number of Physical Resource Block(s) (PRB).

In one embodiment, the first frequency offset comprises a positive integer number of Precoding Resource block Group(s) (PRG).

In one embodiment, the first frequency offset comprises a positive integer number of subcarrier(s).

In one embodiment, the first frequency offset is a constant.

In one embodiment, the first frequency offset is pre-defined.

In one embodiment, the first frequency offset is configurable.

In one embodiment, the first sequence is used for determining a first time-frequency resource pool, the first time-frequency resource pool comprises a positive integer number of time-frequency resource unit(s), a time-frequency resource unit occupied by the first radio signal includes a first time-frequency resource unit, the first time-frequency resource unit is one of the positive integer number of time-frequency resource unit(s).

In one embodiment, a root sequence of the first sequence is used for determining the first time-frequency resource pool.

In one embodiment, a cyclic shift based on the root sequence of the first sequence is used for determining the first time-frequency resource pool.

In one embodiment, a time-frequency resource unit occupied by the first sequence is used for determining the first time-frequency resource pool; a root sequence of the first sequence is used for determining the first time-frequency resource unit out of the first time-frequency resource pool.

In one embodiment, a root sequence of the first sequence is used for determining a time domain resource unit occupied by the first radio signal.

In one embodiment, a root sequence of the first sequence is used for determining a frequency domain resource unit occupied by the first radio signal.

In one embodiment, a cyclic shift based on the root sequence of the first sequence is used for determining a frequency domain resource unit occupied by the first radio signal.

In one embodiment, a frequency domain unit occupied by the first sequence is used for determining a frequency domain resource unit occupied by the first radio signal.

In one embodiment, a frequency domain unit occupied by the first sequence belongs to a frequency domain resource unit occupied by the first radio signal.

In one embodiment, a frequency domain unit occupied by the first sequence is the same as a frequency domain resource unit occupied by the first radio signal.

In one embodiment, a lowest subcarrier in a frequency domain resource unit occupied by the first sequence is the same as a lowest subcarrier in a frequency domain resource unit occupied by the first radio signal.

In one embodiment, the first sequence is used for determining a scrambling sequence of the first radio signal.

In one embodiment, the first sequence is used for determining a receiving timing of the first radio signal.

In one embodiment, the second sequence and the third radio signal are TDM.

In one embodiment, the second characteristic radio signal and the third radio signal are TDM.

In one embodiment, a second characteristic sequence group comprises a positive integer number of characteristic sequence(s), the second characteristic sequence group corresponds to the second random-access channel, the second sequence is one of the positive integer number of characteristic sequence(s) in the second characteristic sequence group.

In one embodiment, any characteristic sequence in the second characteristic sequence group is transmitted on the second random-access channel.

In one embodiment, for the second random-access channel, only one characteristic sequence can be selected from the second characteristic sequence group for transmission.

In one embodiment, the third radio signal is used for determining the second sequence out of the second characteristic sequence group.

In one embodiment, a payload size of the third radio signal is used for determining the second sequence out of the second characteristic sequence group.

In one embodiment, a number of bits comprised in the first bit block is used for determining the second sequence out of the second characteristic sequence group.

In one embodiment, a time-frequency resource unit occupied by the third radio signal is used for determining the second sequence.

In one embodiment, the second sequence is used for determining a time-frequency resource unit occupied by the third radio signal.

In one embodiment, the second sequence is used for determining a frequency domain resource unit occupied by the third radio signal.

In one embodiment, the second sequence is used for determining a time domain resource unit occupied by the third radio signal and a frequency domain resource unit occupied by the third radio signal.

In one embodiment, a time-frequency resource unit occupied by the second sequence is associated with a time-frequency resource unit occupied by the third radio signal.

In one embodiment, a time domain resource unit occupied by the second sequence is associated with a time domain resource unit occupied by the third radio signal.

In one embodiment, a frequency domain resource unit occupied by the second sequence is associated with a frequency domain resource unit occupied by the third radio signal.

In one embodiment, a time-frequency resource unit occupied by the third radio signal is used for determining a time-frequency resource unit occupied by the second sequence.

In one embodiment, a time-frequency resource unit occupied by the second sequence is used for determining a time-frequency resource unit occupied by the third radio signal.

In one embodiment, a time domain resource unit occupied by the second sequence and a time domain resource unit occupied by the third radio signal are differentiated by a second time offset.

In one embodiment, the second time offset comprises a positive integer number of subframe(s).

In one embodiment, the second time offset comprises a positive integer number of slot(s).

In one embodiment, the second time offset comprises a positive integer number of multicarrier symbol(s).

In one embodiment, the second time offset is a constant.

In one embodiment, the second time offset is pre-defined.

In one embodiment, the second time offset is configurable.

In one embodiment, a frequency domain resource unit occupied by the second sequence and a frequency domain resource unit occupied by the third radio signal are differentiated by a second frequency offset.

In one embodiment, a starting frequency domain resource unit of frequency domain resource units occupied by the second sequence and a starting frequency domain resource unit of frequency domain resource units occupied by the third radio signal are spaced apart by the second frequency offset.

In one embodiment, a lowest subcarrier in a frequency domain resource unit occupied by the second sequence and a lowest subcarrier in a frequency domain resource unit occupied by the third radio signal are spaced apart by the second frequency offset.

In one embodiment, the second frequency offset comprises a positive integer number of RB(s).

In one embodiment, the second frequency offset comprises a positive integer number of PRB(s).

In one embodiment, the second frequency offset comprises a positive integer number of PRG(s).

In one embodiment, the second frequency offset comprises a positive integer number of subcarrier(s).

In one embodiment, the second frequency offset is a constant.

In one embodiment, the second frequency offset is pre-defined.

In one embodiment, the second frequency offset is configurable.

In one embodiment, the second sequence is used for determining a second time-frequency resource pool, the second time-frequency resource pool comprises a positive integer number of time-frequency resource unit(s), a time-frequency resource unit occupied by the third radio signal includes a second time-frequency resource unit, the second time-frequency resource unit is one of the positive integer number of time-frequency resource unit(s).

In one embodiment, a root sequence of the second sequence is used for determining the second time-frequency resource pool.

In one embodiment, a cyclic shift based on the root sequence of the second sequence is used for determining the second time-frequency resource pool.

In one embodiment, a time-frequency resource unit occupied by the second sequence is used for determining the second time-frequency resource pool.

In one embodiment, a time-frequency resource unit occupied by the second sequence is used for determining the second time-frequency resource pool, and the root sequence of the second sequence is used for determining the second time-frequency resource unit out of the second time-frequency resource pool.

In one embodiment, the root sequence of the second sequence is used for determining a time domain resource unit occupied by the third radio signal.

In one embodiment, the root sequence of the second sequence is used for determining a frequency domain resource unit occupied by the third radio signal.

In one embodiment, a cyclic shift based on the root sequence of the second sequence is used for determining a frequency domain resource unit occupied by the third radio signal.

In one embodiment, a frequency domain resource unit occupied by the second sequence is used for determining a frequency domain resource unit occupied by the third radio signal.

In one embodiment, a frequency domain resource unit occupied by the second sequence belongs to a frequency domain resource unit occupied by the third radio signal.

In one embodiment, a frequency domain resource unit occupied by the second sequence is the same as a frequency domain resource unit occupied by the third radio signal.

In one embodiment, a lowest subcarrier in a frequency domain resource unit occupied by the second sequence is the same as a lowest subcarrier in a frequency domain resource unit occupied by the third radio signal.

In one embodiment, the second sequence is used for determining a scrambling sequence of the third radio signal.

In one embodiment, the second sequence is used for determining a receiving timing of the third radio signal.

In one embodiment, the second radio signal is transmitted on a Downlink Shared Channel (DL-SCH).

In one embodiment, the second radio signal is transmitted on a Physical Downlink Shared Channel (PDSCH).

In one embodiment, the second radio signal is transmitted on a Physical Sidelink Shared Channel (PSSCH).

In one embodiment, the second radio signal is transmitted on a Physical Downlink Control Channel (PDCCH).

In one embodiment, the second radio signal is transmitted on a Physical Sidelink Control Channel (PSCCH).

In one embodiment, the second radio signal is cell-specific.

In one embodiment, the second radio signal is UE-specific.

In one embodiment, the second radio signal is transmitted via broadcast.

In one embodiment, the second radio signal is transmitted via groupcast.

In one embodiment, the second radio signal is transmitted via unicast.

In one embodiment, the second radio signal is transmitted on licensed spectrum.

In one embodiment, the second radio signal is transmitted on unlicensed spectrum.

In one embodiment, the second radio signal comprises all or part of a higher layer signaling.

In one embodiment, the second radio signal comprises all or part of an RRC layer signaling.

In one embodiment, the second radio signal comprises one or more fields of an RRC IE.

In one embodiment, the second radio signal comprises all or part of a MAC layer signaling.

In one embodiment, the second radio signal comprises one or more fields of a MAC CE.

In one embodiment, the second radio signal comprises a Multimedia Access Control Protocol Data Unit (MAC PDU).

In one embodiment, the second radio signal is a MAC PDU.

In one embodiment, the second radio signal comprises one or more fields of a PHY layer.

In one embodiment, the second radio signal comprises Downlink Control Information (DCI).

In one embodiment, the second radio signal does not comprise DCI.

In one embodiment, the second radio signal comprises Sidelink Control Information (SCI).

In one embodiment, the second radio signal does not comprise SCI.

In one embodiment, the second radio signal comprises DMRS.

In one embodiment, the second radio signal does not comprise DMRS.

In one embodiment, the SCS of subcarriers occupied by the second radio signal in frequency domain is one of 15 kHz, 30 kHz, 60 kHz, 120 kHz, 240 kHz, 480 kHz and 960 kHz.

In one embodiment, the second radio signal comprises Msg B in the 2-step Random Access.

In one embodiment, the second radio signal does not comprise Msg B in the 2-step Random Access.

In one embodiment, the second radio signal comprises all or part of information of a Random Access Response (RAR).

In one embodiment, the second radio signal is an RAR.

In one embodiment, the second radio signal does not comprise RAR.

In one embodiment, the second radio signal comprises the first information block, the first information block comprises a positive integer number f sequentially arranged bits.

In one embodiment, the first information block comprises a positive integer number of CB(s).

In one embodiment, the first information block comprises a positive integer number of CBG(s).

In one embodiment, the first information block comprises a TB.

In one embodiment, the first information block is obtained after a TB is subjected to TB-level CRC Attachment.

In one embodiment, the first information block is a CB of CBs obtained after a TB is subjected to TB-level CRC Attachment, Code Block Segmentation, and CB-level CRC Attachment in sequence.

In one embodiment, the second radio signal is generated after all or part of bits in the first information block are sequentially subjected to TB-level CRC Attachment, Code Block Segmentation, CB-level CRC Attachment, Channel Coding, Rate Matching, Code Block Concatenation, scrambling, Modulation, Layer Mapping, Antenna Port Mapping, Mapping to Physical Resource Blocks, Baseband Signal Generation, and Modulation and Upconversion.

In one embodiment, the second radio signal is an output after the first information block is sequentially subjected to Modulation Mapper, Layer Mapper, Precoding, Resource Element Mapper and Multicarrier Symbol Generation.

In one embodiment, only the first information block is used for generating the second radio signal.

In one embodiment, bit block(s) other than the first information block is(are) also used for generating the second radio signal.

In one embodiment, the first information block comprises all or part of a higher layer signaling.

In one embodiment, the first information block comprises all or part of an RRC layer signaling.

In one embodiment, the first information block comprises all or part of a MAC layer signaling.

In one embodiment, the first information block comprises one or more fields of a MAC CE.

In one embodiment, the first information block comprises one or more fields of a PHY layer.

In one embodiment, the first information block comprises a Multimedia Access Control subheader (MAC subheader).

In one embodiment, the first information block is a MAC subheader.

In one embodiment, the first information block belongs to a Multimedia Access Control sub Protocol Data Unit (MAC subPDU).

In one embodiment, the first information block comprises a positive integer number of first-type fields, and the positive integer number of first-type fields are sequentially arranged in the first information block.

In one subembodiment, among the positive integer number of first-type fields comprised in the first information block at least two occupy equal numbers of bits.

In one subembodiment, among the positive integer number of first-type fields comprised in the first information block at least two occupy unequal numbers of bits.

In one embodiment, the second radio signal comprises a positive integer number of second-type fields; the first information block is one of the positive integer number of second-type fields.

In one embodiment, the first information block is used for generating a scrambling sequence of the second radio signal.

In one embodiment, the first information block is used for determining a time-frequency resource unit occupied by the second radio signal.

In one embodiment, the first information block comprises a first payload.

In one embodiment, the first information block does not comprise a first payload.

In one embodiment, the first payload includes a Multimedia Access Control Payload (MAC payload).

In one embodiment, the first payload is a MAC payload.

In one embodiment, the first payload belongs to a MAC subPDU.

In one embodiment, the first payload comprises at least one of Timing Advance Command (TAC), Uplink Grant (UL Grant) or UE Contention Resolution Identity.

In one embodiment, the first payload comprises TAC.

In one embodiment, the first payload comprises UL Grant.

In one embodiment, the first payload comprises UE Contention Resolution Identity.

In one embodiment, the first identification is used for identifying the first node.

In one embodiment, the first identification is an integer no less than 0 and no greater than 230.

In one embodiment, the first identification is a hexadecimal non-negative integer.

In one embodiment, the first identification comprises a positive integer number of bits.

In one embodiment, the first identification comprises a positive integer number of hexadecimal bits.

In one embodiment, the first identification comprises 4 hexadecimal bits.

In one embodiment, the first identification is a value between hexadecimal 0000 and hexadecimal FFFF.

In one embodiment, the first identification is a Cell Radio Network Temporary Identifier (C-RNTI).

In one embodiment, the first identification is a Temporary Cell Radio Network Temporary Identifier (TC-RNTI).

In one embodiment, the first identification is a Radio Network Temporary Identifier (RNTI).

In one embodiment, the first identification is a Random Access Radio Network Temporary Identifier (RA-RNTI).

In one embodiment, the first identification is a Paging RNTI (P-RNTI).

In one embodiment, the first identification is a Serving Temporary Mobile Subscriber Identity (S-TMSI).

In one embodiment, the first identification is an International Mobile Subscriber Identification Number (IMSI).

In one embodiment, the first identification is a Globally Unique Temporary UE Identity (GUTI).

In one embodiment, the phrase that the first radio signal is used for carrying the first identification means that the first radio signal comprises the first identification.

In one embodiment, the phrase that the first radio signal is used for carrying the first identification means that the first bit block comprises the first identification.

In one embodiment, the first bit block does not comprise the first identification.

In one embodiment, the first bit block comprises N bit(s), the first identification comprises NO bit(s), the NO bit(s) in the first identification belongs(belong) to the N bit(s) in the first bit block. The N is a positive integer, and the NO is a positive integer no greater than the N.

In one embodiment, the phrase that the first radio signal is used for carrying the first identification means that the first identification belongs to the first UCI in the first radio signal.

In one embodiment, the first identification belongs to the second UCI in the third radio signal.

In one embodiment, the phrase that the first radio signal is used for carrying the first identification means that the first identification belongs to the first SCI in the first radio signal.

In one embodiment, the first identification belongs to the second SCI in the third radio signal.

In one embodiment, the first identification is used for generating the first bit block.

In one embodiment, the first identification is used for generating a scrambling sequence of the first radio signal.

In one embodiment, the first identification is used for generating a scrambling sequence of the third radio signal.

In one embodiment, the phrase that the first radio signal is used for carrying the first identification means that the first identification is used for determining a time domain resource unit occupied by the first radio signal.

In one embodiment, the first identification is used for determining a time domain resource unit occupied by the third radio signal.

In one embodiment, the phrase that the first radio signal is used for carrying the first identification means that the first identification is used for determining a frequency domain resource unit occupied by the first radio signal.

In one embodiment, the first identification is used for determining a frequency domain resource unit occupied by the third radio signal.

In one embodiment, the phrase that the first radio signal is used for carrying the first identification means that the first identification is used for determining a time-frequency resource unit occupied by the first radio signal.

In one embodiment, the first identification is used for determining a time-frequency resource unit occupied by the third radio signal.

In one embodiment, the phrase that the first radio signal is used for carrying the first identification means that the first identification is used for determining a first PUSCH Occasion, the first radio signal is transmitted on the first PUSCH Occasion.

In one embodiment, the first identification is used for determining a second PUSCH Occasion, the third radio signal is transmitted on the second PUSCH Occasion.

In one embodiment, the first PUSCH Occasion comprises a positive integer number of time domain resource units.

In one embodiment, the first PUSCH Occasion comprises a positive integer number of frequency domain resource units.

In one embodiment, the first PUSCH Occasion comprises a positive integer number of time-frequency resource units.

In one embodiment, the second PUSCH Occasion comprises a positive integer number of time domain resource units.

In one embodiment, the second PUSCH Occasion comprises a positive integer number of frequency domain resource units.

In one embodiment, the second PUSCH Occasion comprises a positive integer number of time-frequency resource units.

In one embodiment, the phrase that the first radio signal is used for carrying the first identification means that the first identification is used for determining a time-frequency resource unit occupied by the first radio signal out of the positive integer number of time-frequency resource units.

In one embodiment, the first identification is used for determining a time-frequency resource unit occupied by the third radio signal out of the positive integer number of time-frequency resource units.

In one embodiment, the phrase that the first radio signal is used for carrying the first identification means that the first radio signal comprises the first identification or the first identification is used for determining a time-frequency resource unit occupied by the first radio signal.

In one embodiment, the phrase that the first radio signal is used for carrying the first identification means that the first radio signal comprises the first identification or the first identification is used for determining the first PUSCH Occasion occupied by the first radio signal.

In one embodiment, at least one of the first sequence and the first radio signal carries the first identification.

In one embodiment, the first sequence and the first radio signal are jointly used for carrying the first identification.

In one embodiment, the first identification is used for determining at least one of the first sequence, the first radio signal, the time-frequency resource unit occupied by the first sequence or the time-frequency resource unit occupied by the first radio signal.

In one embodiment, the first sequence comprises the first identification.

In one embodiment, the first characteristic radio signal comprises the first identification.

In one embodiment, the first sequence and the first radio signal jointly comprise the first identification.

In one embodiment, the first sequence comprises a first sub-identification, and the first radio signal comprises a second sub-identification, where the first sub-identification and the second sub-identification are jointly used for determining the first identification.

In one embodiment, the first identification is used for generating the first sequence.

In one embodiment, the first identification is used for determining the first sequence out of a positive integer number of characteristic sequences, the first sequence is one of the positive integer number of characteristic sequences.

In one embodiment, the first identification is used for generating the first characteristic radio signal.

In one embodiment, the first identification is used for generating a root sequence of the first sequence.

In one embodiment, the first identification is used for determining a cyclic shift based on the root sequence of the first sequence.

In one embodiment, the first identification is used for determining a time domain resource unit occupied by the first sequence.

In one embodiment, the first identification is used for determining a frequency domain resource unit occupied by the first sequence.

In one embodiment, the first identification is used for determining a time-frequency resource unit occupied by the first sequence.

In one embodiment, the first identification is used for generating the first sequence and the first radio signal.

In one embodiment, the first identification is used for determining a time-frequency resource unit occupied by the first sequence and a time-frequency resource unit occupied by the first radio signal.

In one embodiment, the second radio signal comprises the first identification.

In one embodiment, the first identification is used for generating a scrambling sequence of the second radio signal.

In one embodiment, the first identification is used for generating a CRC of the second radio signal.

In one embodiment, the first identification is used for generating a DMRS of the second radio signal.

In one embodiment, the first random-access channel is used for generating a scrambling sequence of the second radio signal.

In one embodiment, a time domain resource unit and a frequency domain resource unit occupied by the first random-access channel are used for generating a scrambling sequence of the second radio signal.

In one embodiment, when the first information block is correctly received, the third radio signal is transmitted.

In one embodiment, when the first information block is correctly received, the second sequence and the third radio signal are transmitted.

In one embodiment, only when the first information block is correctly received, the third radio signal is transmitted.

In one embodiment, channel decoding is performed on the second radio signal, the first information block is determined to be correctly received according to CRC, and the third radio signal is transmitted.

In one embodiment, receiving power detection is performed on the second radio signal, more than one given threshold determines that the first information block is correctly received, and the third radio signal is transmitted.

In one embodiment, sequence coherent detection is performed on the second radio signal to determine that the first information block is correctly received, and the third radio signal is transmitted.

In one embodiment, channel decoding is performed on the second radio signal, CRC is performed to determine that the first information block is correctly received, and the second sequence and the third radio signal are transmitted.

In one embodiment, receiving power detection is performed on the second radio signal, more than one given threshold determines that the first information block is correctly received, and the second sequence and the third radio signal are transmitted.

In one embodiment, sequence coherent detection is performed on the second radio signal to determine that the first information block is correctly received, and the sequence and the third radio signal are transmitted.

In one embodiment, when the second radio signal is correctly received, the second radio signal comprises the first information block, and the third radio signal is transmitted.

In one embodiment, when the second radio signal is correctly received, the second radio signal comprises the first information block, and the second sequence and the third radio signal are transmitted.

In one embodiment, when the first information block is not correctly received, transmission of the third radio signal is dropped.

In one embodiment, when the first information block is not correctly received, transmission of the second sequence and the third radio signal is dropped.

In one embodiment, channel decoding is performed on the second radio signal, and CRC used to determine that the first information block is not correctly received is not performed, transmission of the third radio signal is dropped.

In one embodiment, receiving power detection is performed on the second radio signal, no more than one given threshold determines that the first information block is not correctly received, and transmission of the third radio signal is dropped.

In one embodiment, sequence coherent detection is performed on the second radio signal to determine that the first information block is not correctly received, and transmission of the third radio signal is dropped.

In one embodiment, channel decoding is performed on the second radio signal, and CRC used to determine that the first information block is not correctly received is not performed, transmission of the second sequence and the third radio signal is dropped.

In one embodiment, receiving power detection is performed on the second radio signal, no more than one given threshold determines that the first information block is not correctly received, and transmission of the second sequence and the third radio signal is dropped.

In one embodiment, sequence coherent detection is performed on the second radio signal to determine that the first information block is not correctly received, and transmission of the second sequence and the third radio signal is dropped.

In one embodiment, the first random-access channel is associated with Z1 first-type characteristic sequence(s), the first sequence is one of the Z1 first-type characteristic sequence(s), where Z1 is a positive integer.

In one embodiment, there exist the Z1 first-type characteristic sequence(s) in the first random-access channel.

In one embodiment, any first-type characteristic sequence of the Z1 first-type characteristic sequence(s) is allowed to be transmitted on the first random-access channel.

In one embodiment, any first-type characteristic sequence of the Z1 first-type characteristic sequence(s) is transmitted on the first random-access channel.

In one embodiment, when any first-type characteristic sequence of the Z1 first-type characteristic sequence(s) is determined to be used for transmission, the any first-type characteristic sequence is transmitted on the first random-access channel.

In one embodiment, a first-type characteristic sequence is selected from the Z1 first-type characteristic sequence(s) to be transmitted on the first random-access channel.

In one embodiment, the first sequence index is used for indicating the first sequence out of the Z1 first-type characteristic sequence(s).

In one embodiment, the first sequence index is the order of the first sequence in the Z1 first-type characteristic sequence(s).

In one embodiment, the first sequence index is a positive integer from 1 to Z1.

In one embodiment, the first sequence index is a non-negative integer from 0 to Z1−1.

In one embodiment, the Z1 is 64.

In one embodiment, the first sequence index comprises nZ bits, where nZ is a positive integer.

In one embodiment, the nZ is 6.

In one embodiment, the first sequence index is a Random Access Preamble Identifier (RAPID).

In one embodiment, the first information block comprises the first sequence index.

In one embodiment, the first information block is the first sequence index.

In one embodiment, the first information block is used for indicating whether the first radio signal is correctly received.

In one embodiment, the first information block is used for indicating that the first radio signal is not correctly received.

In one embodiment, the first information block is used for indicating whether the first bit block is correctly received.

In one embodiment, the first information block is used for indicating that the first bit block is not correctly received.

In one embodiment, the first information block is used for indicating whether the first bit block is correctly decoded.

In one embodiment, the first information block is used for indicating that the first bit block is not correctly decoded.

In one embodiment, the first information block is used for indicating that the first sequence is correctly received, and that the first radio signal is not correctly received.

In one embodiment, the first information block is used for indicating that the first sequence is correctly received, and that the first bit block is not correctly received.

In one embodiment, the first information block comprises the first sequence index; the first bit block is not correctly received.

In one embodiment, the first information block comprises the first sequence index; the first bit block is not correctly decoded.

In one embodiment, the first information block comprises the first sequence index, the first the first sequence is correctly received, and the first bit block is not correctly received.

In one embodiment, the first information block comprises Hybrid Automatic Repeat reQuest (HARQ).

In one embodiment, the first information block comprises Hybrid Automatic Repeat reQuest-Negative Acknowledgement (HARQ-NACK).

In one embodiment, the first information block comprises the first sequence index and a first HARQ.

In one embodiment, the first information block comprises the first sequence index and a first HARQ-NACK.

In one embodiment, the first information block explicitly indicates the first sequence index.

In one embodiment, the first information block implicitly indicates the first sequence index.

In one embodiment, the nZ bits comprised in the first sequence index belong to the first information block.

In one embodiment, the first sequence index is one of the positive integer number of first-type fields in the first information block.

In one embodiment, the first sequence index is used for determining the first information block.

In one embodiment, the first sequence index is used for determining the first information block out of the positive integer number of first-type information blocks, the first information block is one of the positive integer number of first-type information blocks, and the positive integer number of first-type information blocks belong to the second radio signal.

In one embodiment, the first sequence index corresponds to the first information block of the positive integer number of first-type information blocks.

In one embodiment, the meaning of being correctly received includes performing decoding on a radio signal, and the result of decoding on the radio signal passes the CRC.

In one embodiment, the meaning of not being correctly received includes performing decoding on a radio signal, and the result of decoding on the radio signal fails to pass the CRC.

In one embodiment, the radio signal comprises the first sequence.

In one embodiment, the radio signal comprises the first radio signal.

In one embodiment, the radio signal comprises the first bit block.

In one embodiment, the meaning of being correctly received includes performing energy detection on the radio signal in a period, and the average value of the result of the energy detection performed on the radio signal within the period exceeds a first given threshold.

In one embodiment, the meaning of not being correctly received includes performing energy detection on the radio signal in a period, and the average value of the result of the energy detection performed on the radio signal within the period does not exceed a first given threshold.

In one embodiment, the meaning of being correctly received includes performing coherent detection on the radio signal, and the signal energy acquired from the coherent detection on the radio signal exceeds a second given threshold.

In one embodiment, the meaning of not being correctly received includes performing coherent detection on the radio signal, and the signal energy acquired from the coherent detection on the radio signal does not exceed a second given threshold.

In one embodiment, transmission parameters of the third radio signal include a transmitting power of the third radio signal.

In one embodiment, transmission parameters of the third radio signal include a first power offset. The transmitting power of the third radio signal is a sum of a transmitting power of the first radio signal and the first offset.

In one embodiment, the first offset is measured by dB.

In one embodiment, the first offset is measured by mW.

In one embodiment, the first offset is an integer.

In one embodiment, the first offset is one of a collection of −3 dB, −1 dB, 0 dB, 1 dB and 3 dB.

In one embodiment, transmission parameters of the third radio signal include scheduling information of the third radio signal.

In one embodiment, transmission parameters of the third radio signal include a time-frequency resource unit occupied by the third radio signal.

In one embodiment, transmission parameters of the third radio signal include a time domain resource unit occupied by the third radio signal.

In one embodiment, transmission parameters of the third radio signal include a frequency domain resource unit occupied by the third radio signal.

In one embodiment, transmission parameters of the third radio signal include the second PUSCH Occasion.

In one embodiment, transmission parameters of the third radio signal include a first time gap, the first time gap is a time gap between a time domain resource unit occupied by the third radio signal and a time domain resource unit occupied by the first radio signal.

In one embodiment, the first time gap comprises a positive integer number of slot(s).

In one embodiment, the first time gap comprises a positive integer number of subframe(s).

In one embodiment, the first time gap is measured by ms.

In one embodiment, transmission parameters of the third radio signal include a spatial transmission parameter of the third radio signal.

In one embodiment, transmission parameters of the third radio signal include a Modulation and Coding Scheme (MCS) of the third radio signal.

In one embodiment, transmission parameters of the third radio signal include a Redundancy Version (RV) of the third radio signal.

In one embodiment, transmission parameters of the third radio signal include a third DMRS.

In one embodiment, transmission parameters of the third radio signal include a third DMRS port, and the third DMRS port correspond to the third DMRS.

In one embodiment, transmission parameters of the third radio signal include a number of bits in the first bit block.

In one embodiment, transmission parameters of the third radio signal include a time gap between the third radio signal and the first radio signal.

In one embodiment, the first information block comprises transmission parameters of the third radio signal.

In one embodiment, the first information block is used for indicating transmission parameters of the third radio signal.

In one embodiment, the first information block is used for explicitly indicating transmission parameters of the third radio signal.

In one embodiment, the first information block is used for implicitly indicating transmission parameters of the third radio signal.

In one embodiment, transmission parameters of the third radio signal make up at least one of the positive integer number of first-type fields in the first information block.

In one embodiment, a transmitting power of the third radio signal is one of the positive integer number of first-type fields in the first information block.

In one embodiment, a time-frequency resource unit occupied by the third radio signal is one of the positive integer number of first-type fields in the first information block.

In one embodiment, the second PUSCH Occasion is one of the positive integer number of first-type fields in the first information block.

In one embodiment, the MCS of the third radio signal is one of the positive integer number of first-type fields in the first information block.

In one embodiment, the RV of the third radio signal is one of the positive integer number of first-type fields in the first information block.

In one embodiment, the third DMRS is one of the positive integer number of first-type fields in the first information block.

In one embodiment, the third DMRS port is one of the positive integer number of first-type fields in the first information block.

In one embodiment, the second radio signal comprises a positive integer number of sequentially arranged first-type information blocks, the first information block is one of the positive integer number of sequentially arranged first-type information blocks, and an order of the first information block in the positive integer number of sequentially arranged first-type information blocks comprised by the second radio signal is used for determining the transmission parameters of the third radio signal.

In one embodiment, an order of the first information block in the positive integer number of sequentially arranged first-type information blocks comprised by the second radio signal is used for determining the RV of the third radio signal. The second PUSCH Occasion is a first-type field of the positive integer number of first-type fields in the first information block.

Embodiment 2

Figure 2:
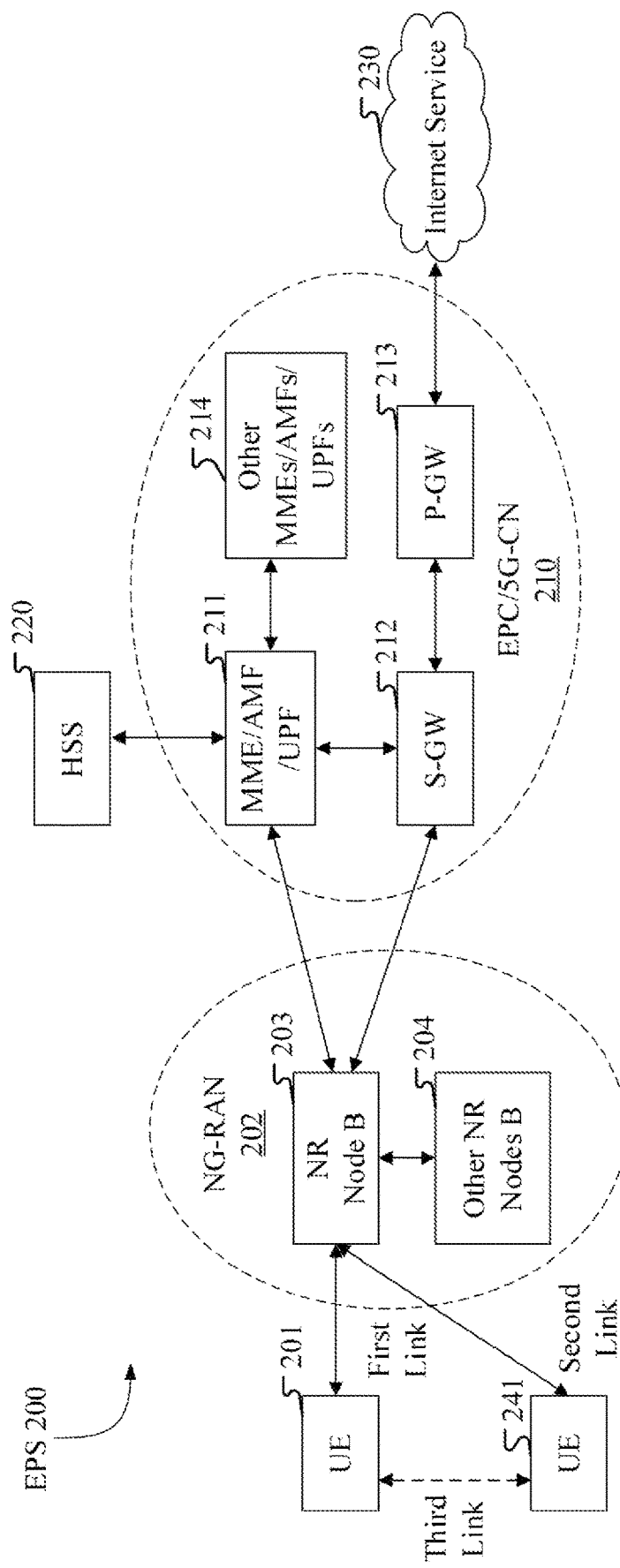
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, a vehicle terminal, V2X equipment or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the first node in the present disclosure includes the UE 201.

In one embodiment, the second node in the present disclosure includes the gNB203.

In one embodiment, the UE in the present disclosure includes the UE 201.

In one embodiment, the base station in the present disclosure includes the gNB203.

In one embodiment, the transmitter of the first sequence in the present disclosure includes the UE 201.

In one embodiment, the receiver of the first sequence in the present disclosure includes the gNB203.

In one embodiment, the transmitter of the first radio signal in the present disclosure includes the UE 201.

In one embodiment, the receiver of the first radio signal in the present disclosure includes the gNB203.

In one embodiment, the receiver of the first signaling in the present disclosure includes the UE 201.

In one embodiment, the transmitter of the first signaling in the present disclosure includes the gNB203.

In one embodiment, the receiver of the second radio signal in the present disclosure includes the UE 201.

In one embodiment, the transmitter of the second radio signal in the present disclosure includes the gNB203.

In one embodiment, the receiver of the third information block in the present disclosure includes the UE 201.

In one embodiment, the transmitter of the third information block in the present disclosure includes the gNB203.

Embodiment 3

Figure 3:
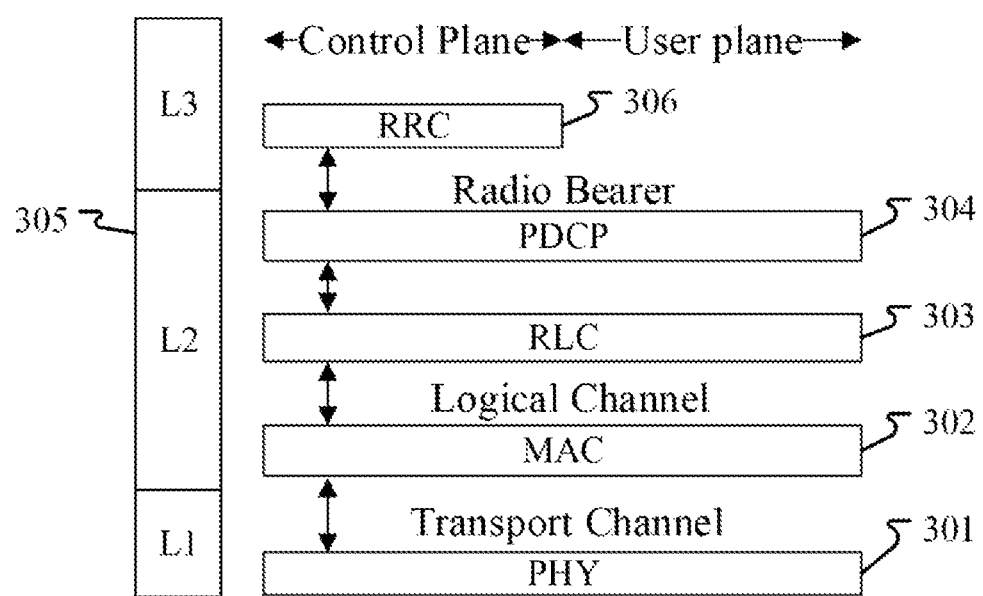
FIG. 3 illustrates a schematic diagram of a radio protocol architecture of a user plane and a control plane according to one embodiment of the present disclosure.

Embodiment 3 illustrates a schematic diagram of an embodiment of a radio protocol architecture of a user plane and a control plane according to the present disclosure, as shown in FIG. 3.

FIG. 3 is a schematic diagram illustrating a radio protocol architecture of a user plane and a control plane. In FIG. 3, the radio protocol architecture for a UE and a base station (gNB or eNB) is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the UE and the basestation via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the base stations of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between base stations. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resource block) in a cell. The MAC sublayer 302 is also in charge of HARQ operation. In the control plane, the radio protocol architecture of the UE and the base station is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the base station and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first sequence in the present disclosure is generated on the PHY 301.

In one embodiment, the first radio signal in the present disclosure is generated on the RRC sublayer 306.

In one embodiment, the first radio signal in the present disclosure is generated on the MAC sublayer 302.

In one embodiment, the first radio signal in the present disclosure is generated on the PHY 301.

In one embodiment, the first signaling in the present disclosure is generated on the PHY 301.

In one embodiment, the second radio signal in the present disclosure is generated on the RRC sublayer 306.

In one embodiment, the second radio signal in the present disclosure is generated on the MAC sublayer 302.

In one embodiment, the second radio signal in the present disclosure is generated on the PHY 301.

In one embodiment, the first information block in the present disclosure is generated on the MAC sublayer 302.

In one embodiment, the second information block in the present disclosure is generated on the MAC sublayer 302.

In one embodiment, the third information block in the present disclosure is generated on the RRC sublayer 306.

Embodiment 4

Figure 4:
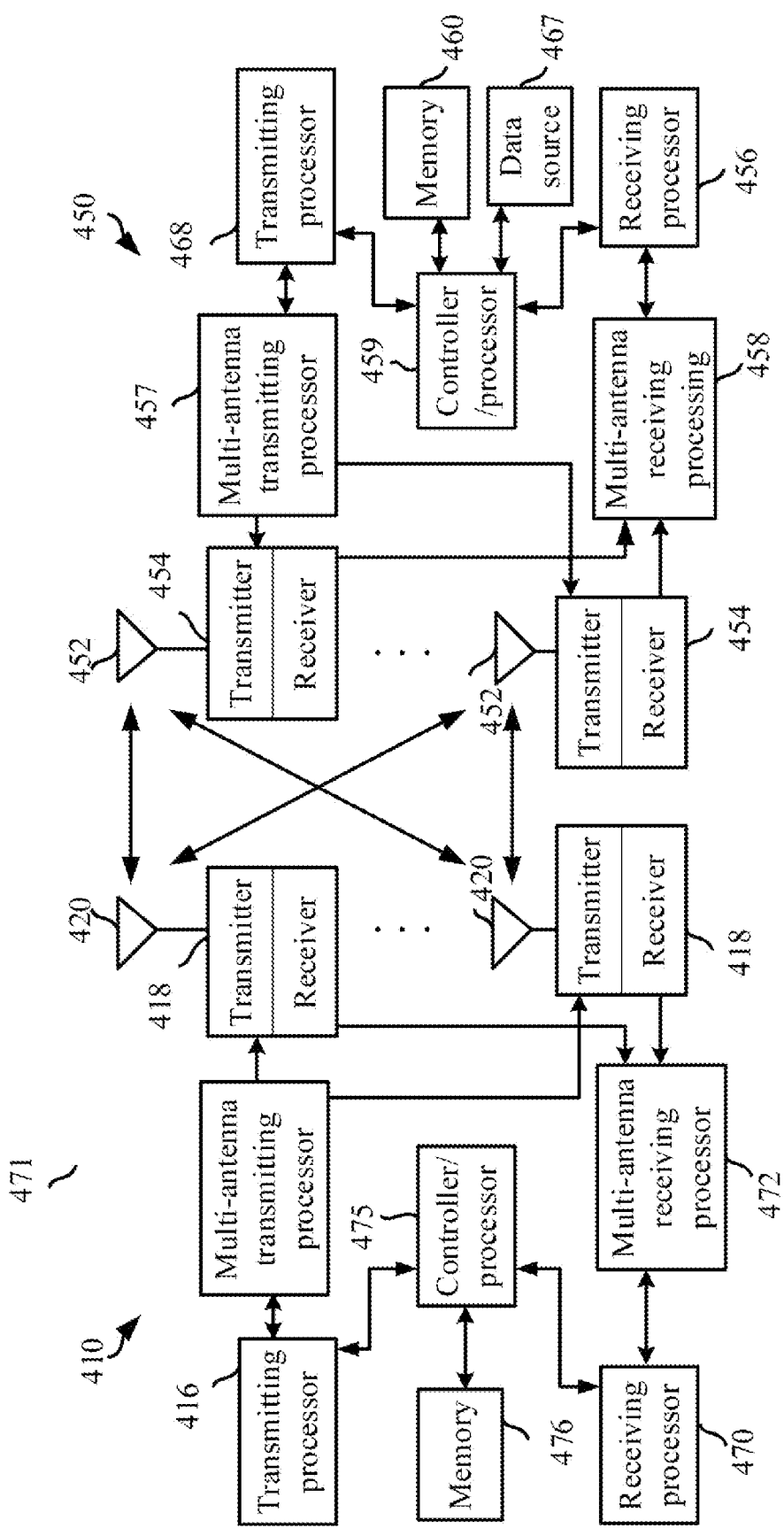
FIG. 4 illustrates a schematic diagram of a first node and a second node according to one embodiment of the present disclosure.

Embodiment 4 illustrates a schematic diagram of a first node (first communication device) and a second node (second communication device) according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. In the transmission from the first communication device 410 to the second communication device 450, the controller/processor 475 provides header compression, encryption, packet segmentation and reordering, multiplexing between a logical channel and a transport channel and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, including codebook-based precoding and non-codebook based precoding, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to antennas 420.

In a transmission from the first communication device 410 to the second communication device 450, at the second communication device 450, each receiver 454 receives a signal via a corresponding antenna 452. Each receiver 454 recovers information modulated onto the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the first communication device 410. The transmitting processor 468 performs modulation and mapping, as well as channel coding, and the multi-antenna transmitting processor 457 performs digital multi-antenna spatial precoding, including codebook-based precoding and non-codebook based precoding, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decrypting, header decompression, control signal processing so as to recover a higher-layer packet from the second communication device 450. The higher-layer packet coming from the controller/processor 475 may be provided to the core network.

In one embodiment, the first node in the present disclosure includes the second communication device 450, while the second node in the present disclosure includes the first communication device 410.

In one subembodiment, the first node is a UE, and the second node is a base station.

In one subembodiment, the first node is a UE, and the second node is a relay node.

In one subembodiment, the first node is a relay node, and the second node is a base station.

In one subembodiment, the second communication device 450 comprises at least one controller/processor. The at least one controller/processor is in charge of HARQ operation.

In one subembodiment, the first communication device 410 comprises at least one controller/processor. The at least one controller/processor is responsible of implementing ACK and/or NACK protocol for error detection as a way to support HARQ operation.

In one subembodiment, the first communication device 410 comprises at least one controller/processor. The at least one controller/processor is in charge of HARQ operation.

In one subembodiment, the second communication device 450 comprises at least one controller/processor. The at least one controller/processor is responsible of implementing ACK and/or NACK protocol for error detection as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least transmits a first sequence and a first radio signal, the first sequence being associated with the first radio signal; and receives a second radio signal; the first radio signal is used for carrying a first identification; the second radio signal comprises a first information block, the first information block comprising a first field and a second field, the second field is used for determining a first value, the first value is a non-negative integer; a value range to which the first field and the second field belong is used for determining whether the second radio signal comprises a second information block, the second information block comprises a first-type identifier, the target identifier belongs to the first-type identifier.

In one embodiment, the second communication device 450 comprises a memory that stores a computer readable instruction program. The computer readable instruction program generates an action when executed by at least one processor. The action includes transmitting a first sequence and a first radio signal, the first sequence being associated with the first radio signal; and receiving a second radio signal; the first radio signal is used for carrying a first identification; the second radio signal comprises a first information block, the first information block comprising a first field and a second field, the second field is used for determining a first value, the first value is a non-negative integer; a value range to which the first field and the second field belong is used for determining whether the second radio signal comprises a second information block, the second information block comprises a first-type identifier, the target identifier belongs to the first-type identifier.

In one embodiment, the first communication device 410 comprises at least one processor and at least one memory. The at least one memory comprises computer program codes. The at least one memory and the computer program codes are configured to be used in collaboration with the at least one processor. The first communication device 410 at least receives a first sequence and a first radio signal, the first sequence being associated with the first radio signal; and transmits a second radio signal; the first radio signal is used for carrying a first identification; the second radio signal comprises a first information block, the first information block comprising a first field and a second field, the second field is used for determining a first value, the first value is a non-negative integer; a value range to which the first field and the second field belong is used for determining whether the second radio signal comprises a second information block, the second information block comprises a first-type identifier, the target identifier belongs to the first-type identifier.

In one embodiment, the first communication device 410 comprises a memory that stores a computer readable instruction program. The computer readable instruction program generates an action when executed by at least one processor. The action includes receiving a first sequence and a first radio signal, the first sequence being associated with the first radio signal; and transmitting a second radio signal; the first radio signal is used for carrying a first identification; the second radio signal comprises a first information block, the first information block comprising a first field and a second field, the second field is used for determining a first value, the first value is a non-negative integer; a value range to which the first field and the second field belong is used for determining whether the second radio signal comprises a second information block, the second information block comprises a first-type identifier, the target identifier belongs to the first-type identifier.

In one embodiment, at least one of the antenna 452, the transmitter 454, the multi-antenna transmitting processor 458, the transmitting processor 468, the controller/processor 459, the memory 460 or the data source 467 is used in the present disclosure for transmitting the first sequence.

In one embodiment, at least one of the antenna 452, the transmitter 454, the multi-antenna transmitting processor 458 or the transmitting processor 468 is used in the present disclosure for transmitting the first sequence.

In one embodiment, at least one of the antenna 452, the transmitter 454, the multi-antenna transmitting processor 458, the transmitting processor 468, the controller/processor 459, the memory 460 or the data source 467 is used in the present disclosure for transmitting the first radio signal.

In one embodiment, at least one of the antenna 452, the transmitter 454, the multi-antenna transmitting processor 458 or the transmitting processor 468 is used in the present disclosure for transmitting the first radio signal.

In one embodiment, at least one of the antenna 452, the receiver 454, the multi-antenna receiving processor 458, the receiving processor 456, the controller/processor 459, the memory 460 or the data source 467 is used in the present disclosure for receiving the first signaling.

In one embodiment, the antenna 452, the receiver 454, the multi-antenna receiving processor 458, the receiving processor 456, the controller/processor 459, the memory 460 and the data source 467 are used in the present disclosure for receiving the first signaling.

In one embodiment, at least one of the antenna 452, the receiver 454, the multi-antenna receiving processor 458, the receiving processor 456, the controller/processor 459, the memory 460 or the data source 467 is used in the present disclosure for receiving the second radio signal.

In one embodiment, the antenna 452, the receiver 454, the multi-antenna receiving processor 458, the receiving processor 456, the controller/processor 459, the memory 460 and the data source 467 are used in the present disclosure for receiving the second radio signal.

In one embodiment, at least one of the antenna 452, the receiver 454, the multi-antenna receiving processor 458, the receiving processor 456, the controller/processor 459, the memory 460 or the data source 467 is used in the present disclosure for receiving the third information block.

In one embodiment, the antenna 452, the receiver 454, the multi-antenna receiving processor 458, the receiving processor 456, the controller/processor 459, the memory 460 and the data source 467 are used in the present disclosure for receiving the third information block.

Embodiment 5

Figure 5:
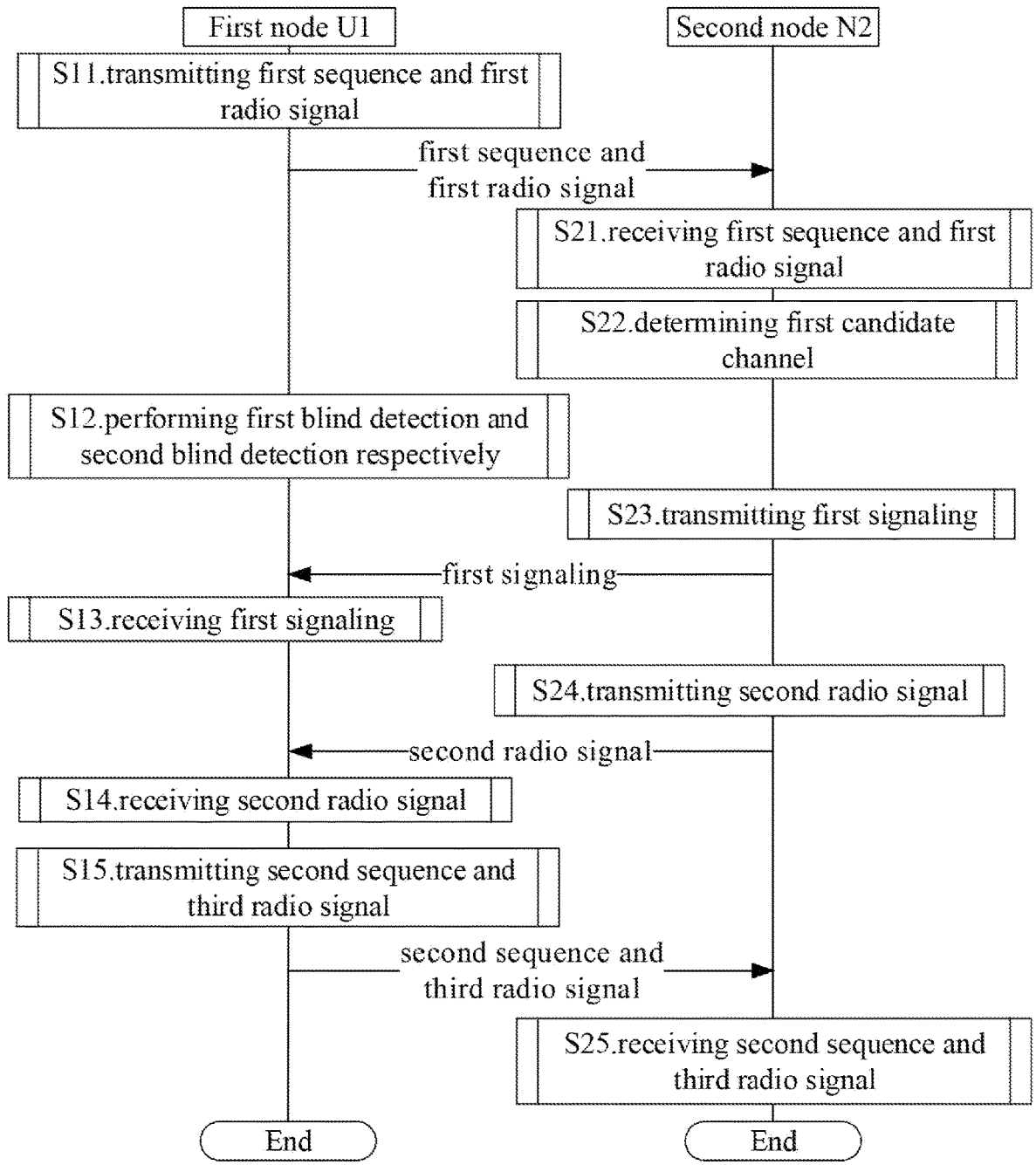
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. In FIG. 5, a first node U1 and a second node N2 are communication nodes that transmit via an air interface.

The first node U1 transmits a first sequence and a first radio signal in step S11; performs a first blind detection and a second blind detection respectively in step S12; receives a first signaling in step S13; receives a second radio signal in step S14; and transmits a second sequence and a third radio signal in step S15.

The second node N2 receives a first sequence and a first radio signal in step S21; determines a first candidate channel in step S22; transmits a first signaling in step S23; transmits a second radio signal in step S24; and receives a second sequence and a third radio signal in step S25.

In Embodiment 5, the first sequence is associated with the first radio signal, the first sequence being transmitted on a first random-access channel, and a first bit block being used for generating the first radio signal; the second radio signal comprises a first information block; the second sequence is associated with the third radio signal, the second sequence being transmitted on a second random-access channel, and the first bit block being used for generating the third radio signal; the first radio signal is used for carrying a first identification; the first information block is used for triggering a transmission of the third radio signal; the first information block comprises a first sequence index, the first sequence index corresponding to the first sequence; the first information block is used for determining transmission parameters of the third radio signal; the first blind detection is performed on a first candidate channel, and the second blind detection is performed on a second candidate channel; the first radio signal is used for triggering the first blind detection and the second blind detection; the second radio signal is detected on the first candidate channel; the first signaling is received in a first time window; a time domain resource unit occupied by the first candidate channel and a time domain resource unit occupied by the second candidate channel belong to the first time window; at least one of radio resource occupied by the first sequence and radio resource occupied by the first radio signal is used for determining the first time window; the first signaling is used for determining scheduling information of the second radio signal.

In one embodiment, the first information block comprises Q first-type response signaling(s). A first response signaling is one of the Q first-type response signaling(s), the first response signaling corresponds to the first sequence, the first response sequence is used for determining that the first bit block is not correctly decoded by the second node N2. Q is a positive integer.

In one embodiment, the first information block comprises a first target signaling, the first target signaling corresponds to the first sequence, the first target signaling is used for determining that the first bit block is not correctly decoded by the second node N2, a target receiver of the first information block is the first node U1.

In one embodiment, the second node N2 is a maintenance base station for a serving cell of the first node U1.

In one embodiment, the second node N2 is an access base station for a serving cell of the first node U1.

In one embodiment, the first signaling comprises scheduling information of the second radio signal.

In one embodiment, the first signaling is used for indicating a time-frequency resource unit occupied by the second radio signal.

In one embodiment, the first signaling is used for indicating an MCS employed by the second radio signal.

In one embodiment, the first signaling is used for indicating a time-frequency resource unit occupied by the second radio signal and an MCS employed by the second radio signal.

In one embodiment, the first signaling is used for indicating a DMRS employed by the second radio signal.

In one embodiment, the first signaling is used for indicating a transmitting power of the second radio signal.

In one embodiment, the first signaling is used for indicating a number of bits comprised in the first information block.

In one embodiment, the first signaling is used for indicating an RV of the second radio signal.

In one embodiment, a time-frequency resource unit occupied by the first signaling is used for determining a time-frequency resource unit occupied by the second radio signal.

In one embodiment, a transmitting power of the first signaling is used for determining a transmitting power of the second radio signal.

In one embodiment, the first signaling is transmitted on a PDCCH.

In one embodiment, the first signaling and the second radio signal are respectively transmitted on a PDCCH and a PDSCH.

In one embodiment, the first signaling and the second radio signal are respectively transmitted on an NPDCCH and an NPDSCH.

In one embodiment, the first signaling and the second radio signal are respectively transmitted on a PSCCH and a PSSCH.

In one embodiment, the first signaling is transmitted via broadcast.

In one embodiment, the first signaling is transmitted via groupcast.

In one embodiment, the first signaling is transmitted via unicast.

In one embodiment, the first signaling is cell-specific.

In one embodiment, the first signaling is UE-specific.

In one embodiment, the first signaling is dynamically configured.

In one embodiment, the first signaling comprises one or more fields of a PHY signaling.

In one embodiment, the first signaling comprises one or more fields of a piece of DCI.

In one embodiment, the first signaling comprises one or more fields of a piece of SCI.

In one embodiment, the first signaling is DCI.

In one embodiment, the first signaling is SCI.

In one embodiment, the first signaling includes the first target signaling in the present disclosure.

In one embodiment, the first signaling is transmitted on the first candidate channel.

In one embodiment, the first signaling is detected on the first candidate channel.

In one embodiment, the first time window comprises a time domain resource unit occupied by the first signaling.

In one embodiment, the first signaling is transmitted in the first time window.

In one embodiment, the first signaling carries a first characteristic identifier.

In one embodiment, the first characteristic identifier is used for scrambling the first signaling.

In one embodiment, the first characteristic identifier is used for generating a scrambling sequence of the first signaling.

In one embodiment, the first characteristic identifier is used for generating a DMRS of the first signaling.

In one embodiment, the first characteristic identifier is used for generating CRC of the first signaling.

In one embodiment, the first characteristic identifier is a hexadecimal non-negative integer.

In one embodiment, the first characteristic identifier comprises 4 hexadecimal bits.

In one embodiment, the first characteristic identifier is a value between hexadecimal 0000 and hexadecimal FFFF.

In one embodiment, the first characteristic identifier is an RNTI.

In one embodiment, the first characteristic identifier is a RA-RNTI.

In one embodiment, the first characteristic identifier is a C-RNTI.

In one embodiment, the first characteristic identifier is a TC-RNTI.

In one embodiment, a time-frequency resource unit occupied by the first sequence is used for determining the first characteristic identifier.

In one embodiment, a time-frequency resource unit occupied by the first radio signal is used for determining the first characteristic identifier.

In one embodiment, a time-frequency resource unit occupied by the first sequence and a time-frequency resource unit occupied by the first radio signal are jointly used for determining the first characteristic identifier.

In one embodiment, the first RACH Occasion is used for determining the first characteristic identifier out of a positive integer number of first-type characteristic identifiers; the first characteristic identifier is one of the positive integer number of first-type characteristic identifiers.

In one embodiment, the first characteristic identifier is a sum of a symbolic index of a first multicarrier symbol of a time-frequency resource unit occupied by the first sequence, a multiple of a slot index of a time domain resource unit occupied by the first sequence, a multiple of a frequency domain resource unit occupied by the first sequence and a multiple of an uplink carrier index.

In one embodiment, the first characteristic identifier is equal to 1+a symbolic index of a first multicarrier symbol of a time-frequency resource unit occupied by the first sequence +14×a multiple of a slot index of a time domain resource unit occupied by the first sequence +14×80×a multiple of a frequency domain resource unit occupied by the first sequence +14×80×8×a multiple of an uplink carrier index.

In one embodiment, the first characteristic identifier is used for generating the first signaling.

In one embodiment, the first characteristic identifier is used for scrambling the first signaling.

In one embodiment, the first characteristic identifier is used for generating CRC of the first signaling.

In one embodiment, the first characteristic identifier is used for generating the second signaling.

In one embodiment, the first characteristic identifier is used for scrambling the second radio signal.

In one embodiment, the first characteristic identifier is used for generating CRC of the second radio signal.

In one embodiment, the first characteristic identifier is used for generating a DMRS of the second radio signal.

In one embodiment, the first time window comprises a positive integer number of slot(s).

In one embodiment, the first time window comprises a positive integer number of multicarrier symbol(s).

In one embodiment, the first time window comprises a positive integer number of subframe(s).

In one embodiment, the first time window comprises a positive integer number of ms.

In one embodiment, parameters of the first time window include one or more of a start of the first time window, an end of the first time window and length of the first time window (Response Window Size).

In one embodiment, a start of the first time window refers to the time when the first node starts monitoring the first signaling.

In one embodiment, an end of the first time window refers to the latest time when the first node stops monitoring the first signaling.

In one embodiment, time length of the first time window refers to a period from the start of the first time window to the end of the first time window.

In one embodiment, the time length of the first time window is an integral multiple of a slot.

In one embodiment, the time length of the first time window is an integral multiple of a multicarrier symbol.

In one embodiment, the time length of the first time window is an integral multiple of a subframe.

In one embodiment, the time length of the first time window is no longer than 10 ms.

In one embodiment, the time length of the first time window is one of 1 slot, 2 slots, 4 slots, 8 slots, 10 slots, 20 slots, 40 slots and 80 slots.

In one embodiment, the time length of the first time window is configured by a higher layer signaling.

Embodiment 6

Figure 6:
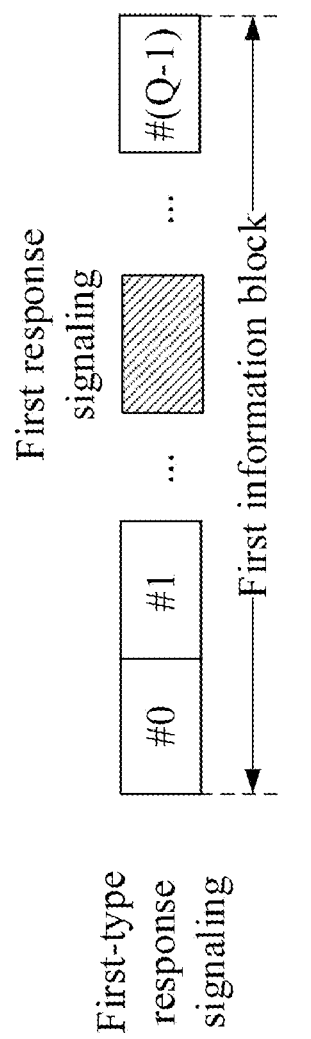
FIG. 6 illustrates a schematic diagram of relations between a first information block, Q first-type response signaling(s) and a first response signaling according to one embodiment of the present disclosure.

Embodiment 6 illustrates a schematic diagram of relations between a first information block, Q first-type response signaling(s) and a first response signaling according to one embodiment of the present disclosure, as shown in FIG. 6. In FIG. 6, each box framed with solid lines represents any of the Q first-type response signaling(s), and the box filled with slashes represents the first response signaling of the present disclosure.

In Embodiment 6, the first information block comprises Q first-type response signaling(s), a first response signaling is one of the Q first-type response signaling(s), the first response signaling corresponds to the first sequence, the first response signaling is used for determining that the first bit block is not correctly decoded, Q is a positive integer.

In one embodiment, a target receiver of the first information block includes a transmitter of the first radio signal.

In one embodiment, a target receiver(s) of the first information block includes(include) a positive integer number of communication node(s), and a transmitter of the first radio signal is one of the positive integer number of communication node(s).

In one embodiment, any of the positive integer number of communication node(s) includes a UE.

In one embodiment, any of the positive integer number of communication node(s) includes relay equipment.

In one embodiment, the Q first-type response signalings are responses respectively corresponding to Q first-type radio signals, at least two of the Q first-type radio signals are transmitted by different UEs.

In one subembodiment, the first radio signal is one of the Q first-type radio signals.

In one subembodiment, one of the Q first-type radio signals other than the first radio signal is transmitted by another UE apart from the first node.

In one subembodiment, the Q first-type radio signals are respectively transmitted by Q UEs, the first node is one of the Q UEs.

In one embodiment, a target receiver(s) of the Q first-type response signaling(s) includes(include) the first node.

In one embodiment, target receivers of the Q first-type response signaling(s) include the first node and one of the positive integer number of communication nodes other than the first node.

In one embodiment, the Q first-type response signaling(s) respectively corresponds(correspond) to the Q first-type radio signal(s).

In one embodiment, the first radio signal is one of the Q first-type radio signal(s), the first response signaling is one of the Q first-type response signaling(s), and the first response signaling corresponds to the first radio signal.

In one embodiment, the Q first-type radio signal(s) respectively comprises(comprise) Q first-type bit block(s), the first bit block is one of the Q first-type bit block(s).

In one embodiment, the Q first-type response signaling(s) respectively corresponds(correspond) to the Q first-type bit block(s), of which the first response signaling corresponds to the first bit block.

In one embodiment, the Q first-type response signaling(s) respectively comprises(comprise) Q first-type information bit(s), the Q first-type information bit(s) respectively corresponds(correspond) to the Q first-type bit block(s).

In one embodiment, the Q first-type information bit(s) is(are) respectively used for determining whether the Q first-type bit block(s) is(are) correctly decoded.

In one embodiment, the Q first-type response signaling(s) respectively comprises(comprise) Q first-type information bit(s), the Q first-type information bit(s) is(are) respectively used for indicating that the Q first-type bit block(s) is(are) not correctly decoded.

In one embodiment, any of the Q first-type information bit(s) is used for determining whether a first-type bit bock corresponding to the any first-type information bit out of the Q first-type bit block(s) is correctly received.

In one embodiment, the first response signaling is used for indicating whether the first bit block is correctly decoded.

In one embodiment, the first response signaling is used for indicating that the first bit block is not correctly decoded.

In one embodiment, what the phrase that the first bit block is correctly decoded means includes decoding the first radio signal, and a result of the decoding of the first radio signal passes CRC check.

In one embodiment, what the phrase that the first bit block is not correctly decoded means includes decoding the first radio signal, and a result of the decoding of the first radio signal fails to pass CRC check.

In one embodiment, what the phrase that the first bit block is correctly decoded means includes decoding the first bit block, and a result of the decoding of the first bit block passes CRC check.

In one embodiment, what the phrase that the first bit block is not correctly decoded means includes decoding the first bit block, and a result of the decoding of the first bit block fails to pass CRC check.

Embodiment 7

Figure 7:
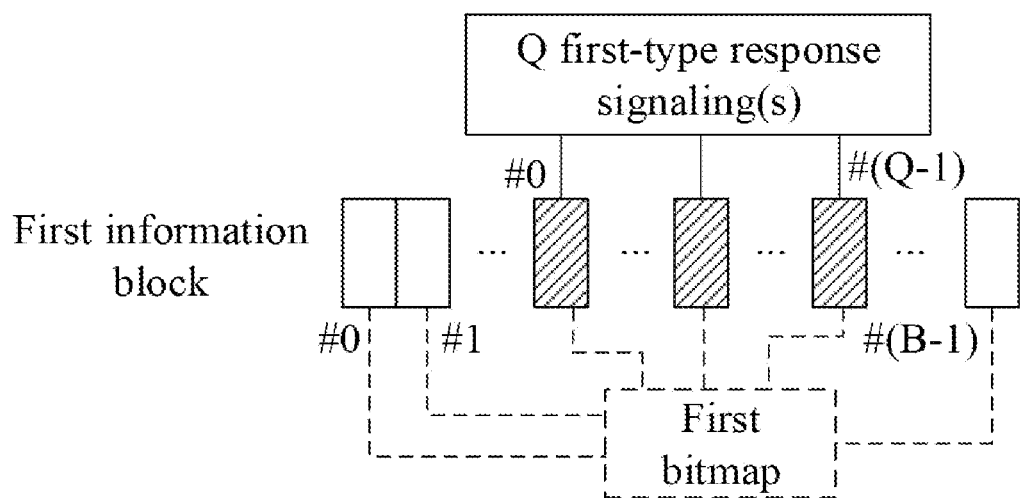
FIG. 7 illustrates a schematic diagram of a relation between Q first-type response signaling(s) and a first bitmap according to one embodiment of the present disclosure.

Embodiment 7 illustrates a schematic diagram of a relation between Q first-type response signaling(s) and a first bitmap according to one embodiment of the present disclosure, as shown in FIG. 7. In FIG. 7, the box framed with broken lines represents the first bitmap in the present disclosure, and each slash-filled box framed with solid lines represents one of the Q first-type response signaling(s) of the present disclosure.

In Embodiment 7, the first information block comprises the first bitmap. The Q first-type response signaling(s) belongs(belong) to the first bitmap, the first bitmap comprises B sequentially arranged binary bit(s), B is a positive integer no less than the Q.

In one embodiment, the number of binary bits comprised in the first bitmap is equal to a number of the Z1 first-type characteristic sequence(s) corresponding to the first random-access channel.

In one embodiment, B binary bit(s) in the first bitmap respectively corresponds(correspond) to the Z1 first-type characteristic sequence(s) in the first random-access channel.

In one embodiment, the B is equal to the Z1.

In one embodiment, the B binary bit(s) in the first bitmap respectively corresponds(correspond) to B first-type radio signal(s), where the Q first-type radio signal(s) belongs (belong) to the B first-type radio signal(s).

In one embodiment, the B first-type radio signal(s) respectively comprises(comprise) B first-type bit block(s), where the Q first-type bit block(s) belong to the B first-type bit block(s).

In one embodiment, the B is equal to the Q.

In one embodiment, any of the B binary bit(s) in the first bitmap is used for indicating whether a given first-type bit block in a given first-type radio signal is correctly decoded, the given first-type radio signal is one of the B first-type radio signal(s). Any binary bit of the B binary bit(s) corresponds to the given first-type radio signal, the given first-type bit block is one of the B first-type bit block(s).

In one embodiment, the B binary bit(s) in the first bitmap is(are) respectively used for indicating whether the B first-type bit block(s) in the B first-type radio signal(s) is(are) correctly decoded.

In one embodiment, when a value of one of the B binary bit(s) in the first bitmap is 0, a first-type bit block corresponding to the binary bit out of the B first-type bit block(s) is correctly decoded.

In one embodiment, when a value of one of the B binary bit(s) in the first bitmap is 0, a first-type characteristic sequence corresponding to the binary bit out of the Z1 first-type characteristic sequence (s) is not detected.

In one embodiment, when a value of one of the B binary bit(s) in the first bitmap is 0, a first-type characteristic sequence corresponding to the binary bit out of the Z1 first-type characteristic sequence (s) is detected, while a first-type bit block corresponding to the binary bit out of the B first-type bit block(s) is correctly decoded.

In one embodiment, when a value of one of the B binary bit(s) in the first bitmap is 1, a first-type bit block corresponding to the binary bit out of the B first-type bit block(s) is not correctly decoded.

In one embodiment, when a value of one of the B binary bit(s) in the first bitmap is 1, a first-type characteristic sequence corresponding to the binary bit out of the Z1 first-type characteristic sequence (s) is detected.

In one embodiment, when a value of one of the B binary bit(s) in the first bitmap is 1, a first-type characteristic sequence corresponding to the binary bit out of the Z1 first-type characteristic sequence (s) is detected, while a first-type bit block corresponding to the binary bit out of the B first-type bit block(s) is not correctly decoded.

In one embodiment, the above phrase that the first-type characteristic sequence is detected means that coherent detection is performed on the first-type characteristic sequence. The signal energy acquired by performing the coherent detection on the first-type characteristic sequence exceeds a third given threshold.

In one embodiment, the above phrase that the first-type characteristic sequence is not detected means that coherent detection is performed on the first-type characteristic sequence. The signal energy acquired by performing the coherent detection on the first-type characteristic sequence does not exceed a third given threshold.

In one embodiment, the first bitmap comprises B HARQ-ACK information bit(s), wherein the B HARQ-ACK information bit(s) is(are) used for indicating one of ACK and NACK.

In one embodiment, the Q first-type response signaling(s) is(are) Q binary bit(s) in the first bitmap, the Q binary bit(s) belongs(belong) to the B binary bit(s), each of the Q binary bit(s) has a value of 1.

In one embodiment, the first bitmap only comprises the Q first-type response signaling(s), and the Q first-type response signaling(s) corresponds(correspond) to the first PUSH Occasion.

In one embodiment, the Q first-type radio signal(s) is(are) transmitted on the first PUSCH Occasion.

In one embodiment, the first PUSCH Occasion is used for determining a scrambling sequence of the second radio signal.

In one embodiment, the first PUSCH Occasion is used for determining a CRC code of the first information block.

In one embodiment, the first PUSCH Occasion is used for determining a time-frequency resource unit occupied by the second radio signal.

In one embodiment, the Q first-type response signaling(s) is(are) respectively Q HARQ-ACK information bit(s), and Q HARQ-ACK information bit(s) is(are) used for indicating one of ACK and NACK.

In one embodiment, the Q first-type response signaling(s) is(are) respectively Q HARQ-ACK information bit(s), and Q HARQ-ACK information bit(s) is(are) used for indicating NACK.

In one embodiment, the first response signaling is a binary bit in the first bitmap, the value of the first response signaling is 0.

In one embodiment, the first response signaling is a binary bit in the first bitmap, the value of the first response signaling is 1.

In one embodiment, when the value of the first response signaling is 1, the first bit block is not correctly decoded.

In one embodiment, when the value of the first response signaling is 0, the first bit block is correctly decoded.

In one embodiment, the first response signaling is a HARQ-ACK information bit of the Q HARQ-ACK information bit(s), wherein the HARQ-ACK information bit is used for indicating NACK.

Embodiment 8

Figure 8:
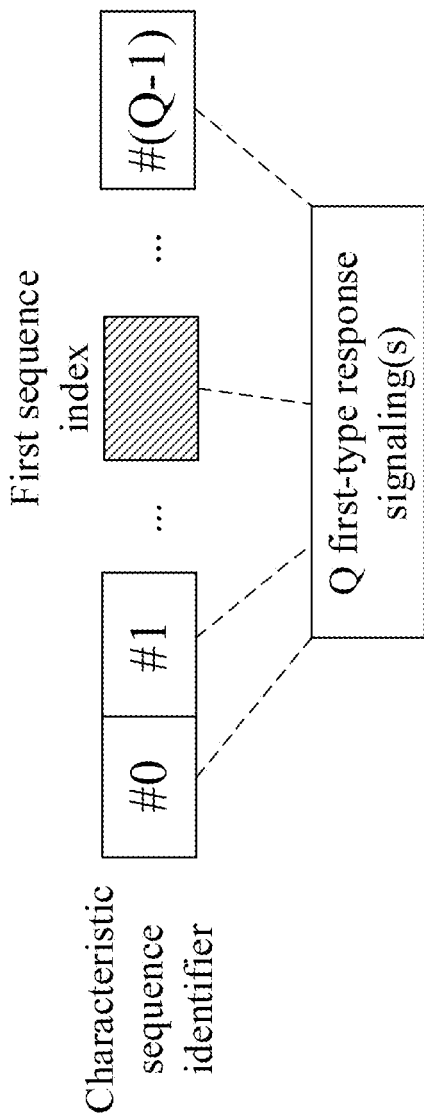
FIG. 8 illustrates a schematic diagram of relation(s) between Q first-type response signaling(s) and Q characteristic sequence identifier(s) according to one embodiment of the present disclosure.

Embodiment 8 illustrates a schematic diagram of relation(s) between Q first-type response signaling(s) and Q characteristic sequence identifier(s) according to one embodiment of the present disclosure, as shown in FIG. 8. In FIG. 8, each box marked with solid lines represents any of the Q characteristic sequence identifier(s), of which the box filled with slashes represents the first sequence index.

In Embodiment 8, the first information block comprises the Q first-type response signaling(s), the Q first-type response signaling(s) respectively comprising Q characteristic sequence identifier(s); the first response signaling is one of the Q first-type response signaling(s).

In one embodiment, the Q first-type response signaling(s) respectively indicates(indicate) that the Q first-type radio signal(s) is(are) not correctly received.

In one embodiment, the Q first-type response signaling(s) respectively indicates(indicate) that the Q first-type bit block(s) of the Q first-type radio signal(s) is(are) not correctly decoded.

In one embodiment, the Q first-type response signaling(s) respectively indicates(indicate) that Q first-type characteristic sequence(s) is(are) detected, and the Q first-type radio signal(s) is(are) not correctly received; the Q first-type characteristic sequence(s) is(are) respectively associated with the Q first-type radio signal(s).

In one embodiment, the Q first-type response signaling(s) respectively indicates(indicate) that Q first-type characteristic sequence(s) is(are) detected, and the Q first-type bit block(s) of the Q first-type radio signal(s) are not correctly decoded, the Q first-type characteristic sequence(s) being respectively associated with the Q first-type bit block(s).

In one embodiment, the Q first-type characteristic sequence(s) belongs(belong) to the Z1 first-type characteristic sequence(s) on the first random-access channel.

In one embodiment, the Q first-type characteristic sequences are transmitted by different UEs.

In one embodiment, the first sequence is one of the Q first-type characteristic sequence(s).

In one embodiment, the Q first-type characteristic sequence identifier(s) is(are) respectively used for identifying Q first-type characteristic sequence(s), wherein the Q first-type characteristic sequence(s) belongs(belong) to the Z1 first-type characteristic sequence(s) on the first random-access channel.

In one embodiment, the Q characteristic sequence identifier(s) respectively corresponds(correspond) to the Q first-type characteristic sequence(s), a given characteristic sequence identifier is any one of the Q first-type characteristic sequence identifier(s), a given first-type characteristic sequence is one of the Q first-type characteristic sequence(s), the given characteristic sequence identifier corresponds to the given first-type characteristic sequence and the given characteristic sequence identifier is used for indicating the given first-type characteristic sequence out of the Z1 first-type characteristic sequence(s).

In one embodiment, any of the Q characteristic sequence identifier(s) is a non-negative integer.

In one embodiment, any of the Q characteristic sequence identifier(s) is a RAPID.

In one embodiment, any of the Q characteristic sequence identifier(s) is an integer out of 0, 1, 2 . . . and Z1−1.

In one embodiment, any of the Q characteristic sequence identifier(s) is a non-negative integer out of Z1 non-negative integers ranging from 0 to Z1−1, which are arranged in an ascending order.

In one embodiment, any of the Q characteristic sequence identifier(s) is an integer out of 1, 2 . . . and Z1.

In one embodiment, any of the Q characteristic sequence identifier(s) is a positive integer out of Z1 positive integers ranging from 1 to Z1, which are arranged in an ascending order.

In one embodiment, the first response signaling is one of the Q characteristic sequence identifiers.

In one embodiment, the first response signaling is the first sequence index.

In one embodiment, the first response signaling is RAPID.

In one embodiment, the first sequence index is one of the Q characteristic sequence identifier(s).

In one embodiment, the first response signaling comprises the first sequence index.

In one embodiment, the first response signaling is the first sequence index.

In one embodiment, the first response signaling comprises a positive integer number of bit(s).

In one embodiment, the first response signaling comprises 6 bits.

In one embodiment, the first response signaling indicates that the first sequence is detected, and the first radio signal is not correctly received.

In one embodiment, the first response signaling indicates that the first sequence is detected, and the first bit block is not correctly decoded.

Embodiment 9

Figure 9:
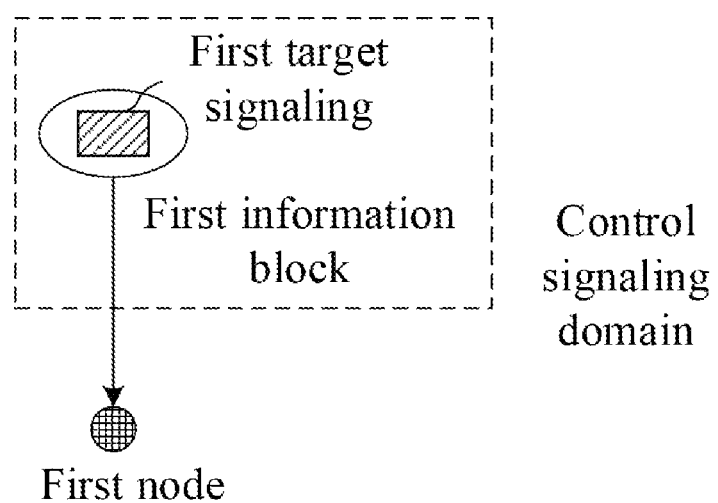
FIG. 9 illustrates a schematic diagram of a relation between a first information block and a first target signaling according to one embodiment of the present disclosure.

Embodiment 9 illustrates a schematic diagram of a relation between a first information block and a first target signaling according to one embodiment of the present disclosure, as shown in FIG. 9. In FIG. 9, the large box marked with broken lines represents a control signaling domain, the ellipsis represents the first information block in the present disclosure, and the small box filled with slashes represents the first target signaling.

In Embodiment 9, the first information block in the present disclosure comprises a first target signaling, the first target signaling corresponding to the first sequence; the first target signaling is used for determining that the first bit block is not correctly decoded; a target receiver of the first information block is the first node.

In one embodiment, the first target signaling comprises one or more fields of a MAC layer signaling.

In one embodiment, the first target signaling comprises one or more fields of a PHY layer signaling.

In one embodiment, the first target signaling comprises one or more fields of a piece of DCI.

In one embodiment, the first target signaling is a piece of DCI.

In one embodiment, the first target signaling comprises one or more fields of a piece of SCI.

In one embodiment, the first target signaling is a piece of SCI.

In one embodiment, the first target signaling is transmitted on a Control Resource Set (CORESET).

In one embodiment, the first target signaling is transmitted on a PDCCH.

In one embodiment, the first target signaling is transmitted on a PSCCH.

In one embodiment, the first target signaling is UE-specific.

In one embodiment, the first target signaling is unicast.

In one embodiment, the first target signaling is dynamically configured.

In one embodiment, the first target signaling is semi-statically configured.

In one embodiment, the first target signaling comprises a positive integer number of bits, the positive integer number of bits comprised by the first target signaling belong to the first information block.

In one embodiment, the first target signaling is used for generating the first information block.

In one embodiment, the first target signaling is used for determining a scrambling sequence of the first information block.

In one embodiment, the first target signaling is used for determining a scrambling sequence of the second radio signal; the first information block is used for generating the second radio signal.

In one embodiment, the first target signaling is used for indicating that the first sequence is correctly received.

In one embodiment, the first target signaling carries the first sequence index.

In one embodiment, the first sequence index belongs to the positive integer number of bit(s) comprised in the first target signaling.

In one embodiment, the first sequence index is used for determining the first information block out of a positive integer number of first-type information block(s), the first information block is one of the positive integer number of first-type information block(s); the positive integer number of first-type information block(s) belong to the second radio signal, and the first information block comprises the first target signaling.

In one embodiment, the first sequence index is used for determining a scrambling sequence of the first information block.

In one embodiment, the first sequence index is used for determining a scrambling sequence of the second radio signal, the first information block in the second radio signal comprises the first target signaling.

In one embodiment, the first target signaling is used for indicating that the first bit block is not correctly decoded.

In one embodiment, the first target signaling is used for indicating that the first sequence is correctly received, and that the first bit block is not correctly decoded.

In one embodiment, the first sequence index is used for scrambling the second radio signal, while the first target signaling is used for indicating that the first bit block is not correctly decoded.

In one embodiment, the first sequence index is used for determining a time-frequency resource unit occupied by the second radio signal, while the first target signaling is used for indicating that the first bit block is not correctly decoded.

In one embodiment, the first target signaling comprises a first indicating bit; the first indicating bit has a value of 0, which indicates that the first bit block is not correctly received.

In one embodiment, the first target signaling comprises a first indicating bit; the first indicating bit has a value of 1, which indicates that the first bit block is correctly received.

In one embodiment, the first target signaling comprises a first indicating bit; the value of the first indicating bit is reversed, which indicates that the first bit block is correctly received.

In one embodiment, the first target signaling comprises a first indicating bit; the value of the first indicating bit is not reversed, which indicates that the first bit block is not correctly received.

In one embodiment, what being reversed means is that the value is changed from 0 to 1, or the value is changed from 1 to 0.

In one embodiment, what being reversed means is that the value is changed from positive to negative, or the value is changed from negative to positive.

In one embodiment, what being not reversed means is that the value stays unchanged.

In one embodiment, the first target signaling comprises a New Data Indicator (NDI).

In one embodiment, the first target signaling comprises HARQ-ACK information.

In one embodiment, the first target signaling comprises only NACK of HARQ-ACK information.

In one embodiment, the first target signaling is used for indicating transmission parameters of the third radio signal.

In one embodiment, a target receiver of the second radio signal is the first node, the second radio signal comprising the first information block.

In one embodiment, target receivers of the second radio signal include Y1 communication nodes, the first node is one of the Y1 communication nodes included by the target receivers of the second radio signal; Y1 is a positive integer greater than 1.

In one embodiment, a target receiver of the second radio signal only includes one communication node; the communication node included by the target receiver of the second radio signal is the first node.

In one embodiment, the second radio signal comprises the first identification.

In one embodiment, the first identification is used for scrambling the second radio signal.

In one embodiment, target receivers of the first information block include Y2 communication nodes, the first node is one of the Y2 communication nodes included by the target receivers of the first information block; Y2 is a positive integer greater than 1.

In one embodiment, a target receiver of the first information block only includes one communication node; the communication node included by the target receiver of the first information block is the first node.

In one embodiment, the first information block comprises the first identification.

In one embodiment, the first identification belongs to a positive integer number of bits comprised by the first information block.

In one embodiment, the first identification is used for scrambling the first information block.

Embodiment 10

Figure 10:
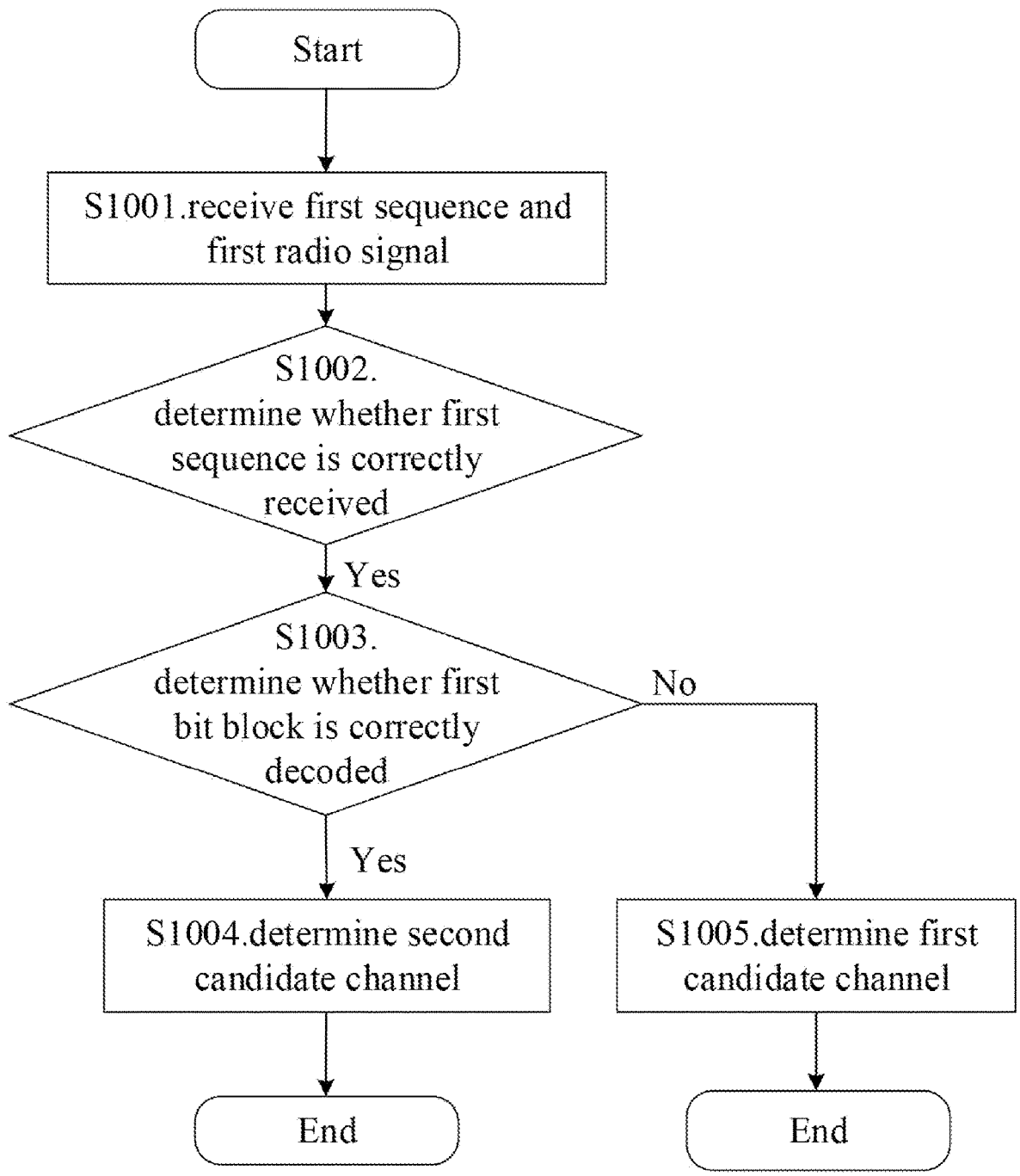
FIG. 10 illustrates a flowchart of determining a first candidate channel according to one embodiment of the present disclosure.

Embodiment 10 illustrates a flowchart of determining a first candidate channel according to one embodiment of the present disclosure, as shown in FIG. 10. In FIG. 10, a first sequence and a first radio signal are received in step S1001; whether a first sequence is correctly received is determined in step S1002; if yes, whether a first bit block is correctly decoded is determined in step S1003; if yes, a second candidate channel is determined in step S1004; if no, the second candidate channel is determined in step S1005.

In Embodiment 10, a first blind detection and a second blind detection are respectively performed on a first candidate channel and a second candidate channel in the present disclosure; the first radio signal is used for triggering the first blind detection and the second blind detection; the second radio signal is detected on the first candidate channel.

In one embodiment, a time-frequency resource unit occupied by the first candidate channel is different from a time-frequency resource unit occupied by the second candidate channel.

In one embodiment, a time domain resource unit occupied by the first candidate channel is different from a time domain resource unit occupied by the second candidate channel.

In one embodiment, a frequency domain resource unit occupied by the first candidate channel is different from a frequency domain resource unit occupied by the second candidate channel.

In one embodiment, the first candidate channel includes PDCCH, while the second candidate channel includes PDSCH.

In one embodiment, the first candidate channel includes NPDCCH, while the second candidate channel includes NPDSCH.

In one embodiment, the first candidate channel includes PSCCH, while the second candidate channel includes PSSCH.

In one embodiment, the first candidate channel includes PDCCH, while the second candidate channel includes PDCCH and PDSCH.

In one embodiment, the first candidate channel includes NPDCCH, while the second candidate channel includes NPDCCH and PDSCH.

In one embodiment, the first candidate channel includes PSCCH, while the second candidate channel includes PSCCH and PSSCH.

In one embodiment, the first candidate channel does not include PDSCH.

In one embodiment, the first candidate channel does not include NPDSCH.

In one embodiment, the first candidate channel does not include PSSCH.

In one embodiment, the first candidate channel includes physical channel, while the second candidate channel includes transport channel.

In one embodiment, the first candidate channel includes physical channel, while the second candidate channel includes logical channel.

In one embodiment, the first candidate channel includes PDCCH, while the second candidate channel includes DL-SCH.

In one subembodiment, the first candidate channel does not include DL-SCH.

In one embodiment, the first candidate channel is used for transmitting information to a communication node, while the second candidate channel is used for transmitting information to a plurality of communication nodes.

In one embodiment, the first candidate channel is UE-specific, while the second candidate channel is cell-specific.

In one embodiment, the first candidate channel is used for unicast transmission, while the second candidate channel is used for broadcast transmission.

In one embodiment, the first candidate channel is used for unicast transmission, while the second candidate channel is used for groupcast transmission.

In one embodiment, the first candidate channel and the second candidate channel are both transmitted via broadcast.

In one embodiment, the first candidate channel and the second candidate channel are both cell-specific.

In one embodiment, the first blind detection includes: before the second radio signal is correctly received on the first candidate channel, it is impossible to determine whether the second radio signal has been transmitted.

In one embodiment, the first blind detection includes: before the second radio signal is correctly received on the first candidate channel, it is impossible to determine whether the second radio signal has been transmitted on the first candidate channel.

In one embodiment, the first blind detection includes performing N1 times of decoding on the first candidate channel, where N1 is a positive integer greater than 1; any of the N1 times of decoding includes determining whether the second radio signal is correctly received based on whether a result of the decoding on the second radio signal has passed CRC check.

In one embodiment, the N1 times of decoding are based on Viterbi algorithm.

In one embodiment, any of the N1 times of decoding is based on iterative algorithm.

In one embodiment, the N1 times of decoding are based on belief propagation (BP) algorithm.

In one embodiment, the N1 times of decoding are based on log likelihood radio (LLR)-BP algorithm.

In one embodiment, the first blind detection includes: performing N2 times of sequence coherent detections on the first candidate channel, N2 being a positive integer number greater than 1; any of the N2 times of sequence coherent detections includes determining whether the second radio signal is transmitted according to whether a result of the sequence coherent detection exceeds a second threshold.

In one embodiment, the first blind detection includes: performing N2 times of sequence coherent detections on the first candidate channel, N2 being a positive integer number greater than 1; any of the N2 times of sequence coherent detections includes determining whether the second radio signal is transmitted on the first candidate channel according to whether a result of the sequence coherent detection exceeds a second threshold.

In one embodiment, a fourth radio signal is transmitted on the second candidate channel.

In one embodiment, the second blind detection includes: before the fourth radio signal is correctly received on the second candidate channel, it is impossible to determine whether the fourth radio signal is transmitted.

In one embodiment, the second blind detection includes: before the fourth radio signal is correctly received on the second candidate channel, it is impossible to determine whether the fourth radio signal is transmitted on the second candidate channel.

In one embodiment, the second blind detection includes: performing N3 times of decoding on the second candidate channel, wherein N3 is a positive integer greater than 1; any of the N3 times of decoding includes determining whether the fourth radio signal is correctly received based on whether a result of the decoding on the fourth radio signal has passed CRC check.

In one embodiment, the N3 times of decoding are based on Viterbi algorithm.

In one embodiment, any of the N3 times of decoding is based on iterative algorithm.

In one embodiment, the N3 times of decoding are based on BP algorithm.

In one embodiment, the N3 times of decoding are based on LLR-BP algorithm.

In one embodiment, the second blind detection includes: N4 times of sequence coherent detections on the second candidate channel, N4 being a positive integer number greater than 1; any of the N4 times of sequence coherent detections includes determining whether the fourth radio signal is transmitted according to whether a result of the sequence coherent detection exceeds a second threshold.

In one embodiment, the second blind detection includes: N4 times of sequence coherent detections on the second candidate channel, N4 being a positive integer number greater than 1; any of the N4 times of sequence coherent detections includes determining whether the fourth radio signal is transmitted on the second candidate channel according to whether a result of the sequence coherent detection exceeds a second threshold.

In one embodiment, when the first radio signal is transmitted, the first blind detection and the second blind detection are performed.

In one embodiment, when the first radio signal is transmitted, the first blind detection is performed on the first candidate channel, while the second blind detection is performed on the second candidate channel.

In one embodiment, only when the first radio signal is transmitted can the first blind detection and the second blind detection be performed.

In one embodiment, only when the first radio signal is transmitted can the first blind detection be performed on the first candidate channel and the second blind detection performed on the second candidate channel.

In one embodiment, when the first radio signal is not transmitted, the first blind detection and the second blind detection cannot be performed.

In one embodiment, when the first radio signal is not transmitted, performing of the first blind detection on the first candidate channel and the second detection on the second candidate channel is dropped.

In one embodiment, the phrase that the second radio signal is detected on the first candidate channel means that the second radio signal is transmitted only on the first candidate channel between the first candidate channel and the second candidate channel.

In one embodiment, the phrase that the second radio signal is detected on the first candidate channel means that the second radio signal is received only on the first candidate channel between the first candidate channel and the second candidate channel.

In one embodiment, when the first sequence is not correctly received, transmission of the second radio signal on the first candidate channel is dropped.

In one embodiment, when the first sequence is correctly received, and the first bit block is not correctly decoded, then the second radio signal is transmitted on the first candidate channel.

Embodiment 11

Figure 11:
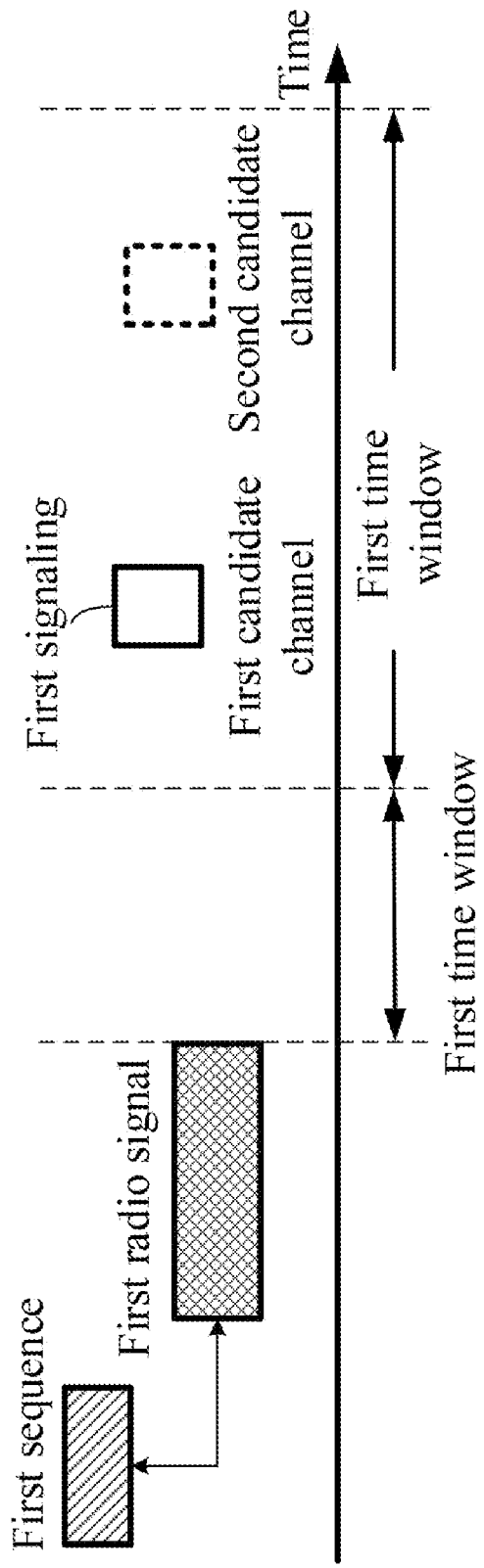
FIG. 11 illustrates a schematic diagram of respective relations of a first sequence, a first radio signal, a first signaling and a second radio signal with a first time window according to one embodiment of the present disclosure.

Embodiment 11 illustrates a schematic diagram of respective relations of a first sequence, a first radio signal, a first signaling and a second radio signal with a first time window according to one embodiment of the present disclosure, as shown in FIG. 11. In FIG. 11, the horizontal axis represents time; the square filled with slashes represents a first sequence, the square filled with grids represents a first radio signal, the blank square marked with solid lines represents a first candidate channel, and the blank square marked with broken lines represents a second candidate channel; a time gap between an end of the time domain resource unit occupied by the first radio signal and a start of the first time window is a first time gap.

In Embodiment 11, a first signaling is monitored in the first time window of the present disclosure, a time-frequency resource unit occupied by the first candidate channel and a time-frequency resource unit occupied by the second candidate channel both belong to the first time window; at least one of the time-frequency resource unit occupied by the first sequence and the time-frequency resource unit occupied by the first radio signal is used for determining the first time window; the first signaling is used for determining scheduling information of the second radio signal.

In one embodiment, the scheduling information of the second radio signal comprises at least one of the time-frequency resource unit occupied by the second radio signal, the MCS employed by the second radio signal or the RV employed by the second radio signal.

In one embodiment, the scheduling information of the second radio signal comprises the time-frequency resource unit occupied by the second radio signal.

In one embodiment, the scheduling information of the second radio signal comprises the MCS employed by the second radio signal In one embodiment, the scheduling information of the second radio signal comprises the RV employed by the second radio signal.

In one embodiment, the first node monitors the first signaling within the first time window.

In one embodiment, the monitoring action refers to receiving based on blind detection, that is, the first node receives a signal within the first time window and performs decoding, if the decoding is determined as correct according to a CRC bit, then it is determined that the first signaling is successfully received in the first time window; if the decoding is determined as incorrect according to the CRC bit, then it is determined that the first signaling is not successfully detected in the first time window.

In one embodiment, the monitoring action refers to receiving based on coherent detection, that is, the first node performs coherent reception on a radio signal within the first time window, employing an RS sequence corresponding to the DMRS of the first signaling, and then measures signal energy acquired after the coherent reception; if the signal energy acquired after the coherent reception is greater than a first given threshold, then it is determined that the first signaling is successfully received within the first time window; if the signal energy acquired after the coherent reception is no greater than a first given threshold, then it is determined that the first signaling is not successfully received within the first time window.

In one embodiment, the monitoring action refers to receiving based on energy detection, that is, the first node senses energy of a radio signal within the first time window and averages the energy in time to acquire a received energy; if the received energy is greater than a second given threshold, it is then determined that the first signaling is successfully received in the first time window; if the received energy is no greater than a second given threshold, it is then determined that the first signaling is not successfully received in the first time window.

In one embodiment, the phrase that the first signaling is detected means that after the first signaling is received based on a blind detection, the decoding is determined as correct according to a CRC bit.

In one embodiment, a time-frequency resource unit occupied by the first radio signal is used for determining a start of the first time window.

In one embodiment, a time-frequency resource unit occupied by the first radio signal comprises at least one of a time domain resource unit occupied by the first radio signal and a frequency domain resource unit occupied by the first radio signal.

In one embodiment, a time-frequency resource unit occupied by the first radio signal comprises a time domain resource unit occupied by the first radio signal.

In one embodiment, a time-frequency resource unit occupied by the first radio signal comprises a frequency domain resource unit occupied by the first radio signal.

In one embodiment, a time-frequency resource unit occupied by the first radio signal a time domain resource unit occupied by the first radio signal and a frequency domain resource unit occupied by the first radio signal.

In one embodiment, a time-frequency resource unit occupied by the first sequence is used for determining a start of the first time window.

In one embodiment, a time-frequency resource unit occupied by the first sequence comprises at least one of a time domain resource unit occupied by the first sequence and a frequency domain resource unit occupied by the first sequence.

In one embodiment, a time-frequency resource unit occupied by the first sequence comprises a time domain resource unit occupied by the first sequence.

In one embodiment, a time-frequency resource unit occupied by the first sequence comprises a frequency domain resource unit occupied by the first sequence.

In one embodiment, a time gap between an end of a time domain resource unit occupied by the first sequence and a start of the first time window; the length of the first time gap is no less than a first time threshold, the first time threshold is pre-defined.

In one embodiment, a time gap between an end of a time domain resource unit occupied by the first sequence and a start of the first time window; the length of the first time gap is no less than a first time threshold, the first time threshold is configurable.

In one embodiment, a time gap between an end of a time domain resource unit occupied by the first sequence and a start of the first time window; the length of the first time gap is no less than 1 ms.

In one embodiment, the first time threshold is related to an SCS of subcarriers occupied by the first signaling.

In one embodiment, the first time threshold is equal to a length of a multicarrier symbol of multicarrier symbols occupied by the first signaling.

Embodiment 12

Figure 12:
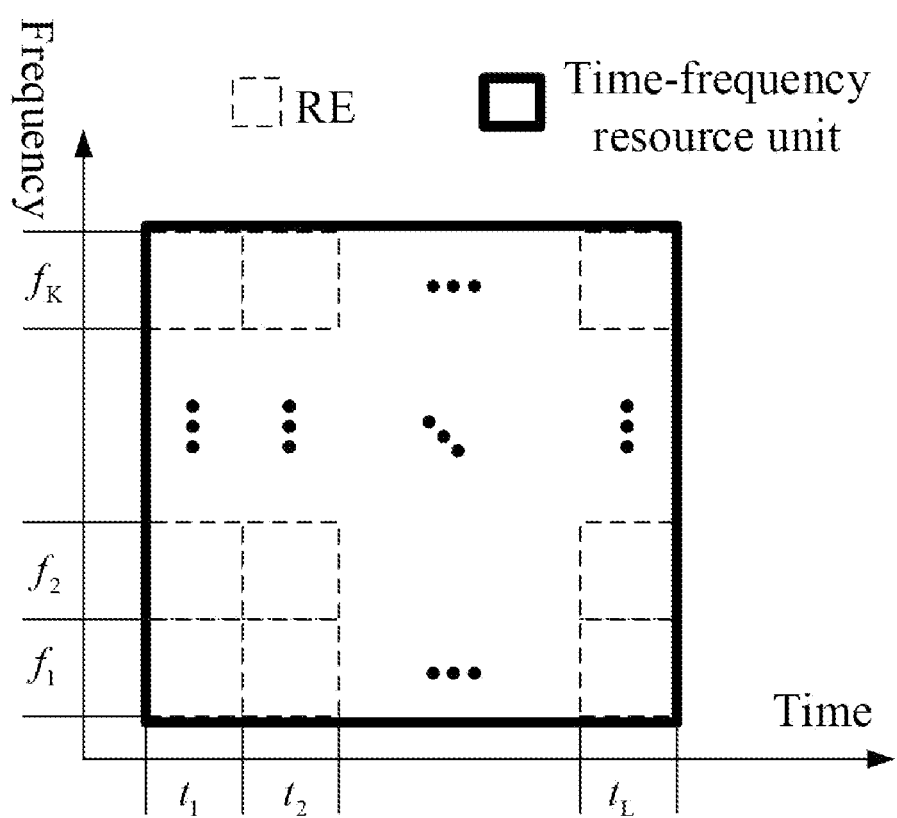
FIG. 12 illustrates a schematic diagram of a time-frequency resource according to one embodiment of the present disclosure.

Embodiment 12 illustrates a schematic diagram of a time-frequency resource according to one embodiment of the present disclosure, as shown in FIG. 12. In FIG. 12, each small box marked with broken lines represents a Resource Element (RE), and the large box framed with thick solid lines represents a time-frequency resource. In FIG. 12, a time-frequency resource occupies K subcarrier(s) in frequency domain and L multicarrier symbol(s) in time domain; K and L are positive integers. In FIG. 12, $t_1$, $t_2$ . . . and $t_L$ respectively represent the L multicarrier symbol(s), while $f_1$, $f_2$ . . . and $f_K$ respectively represent the K subcarrier(s).

In Embodiment 12, a time-frequency resource unit occupies the K subcarrier(s) in frequency domain and the L multicarrier symbol(s) in time domain, where the K and the L are positive integers.

In one embodiment, the K is equal to 12.

In one embodiment, the K is equal to 72.

In one embodiment, the K is equal to 127.

In one embodiment, the K is equal to 240.

In one embodiment, the L is equal to 1.

In one embodiment, the L is equal to 2.

In one embodiment, the L is no greater than 14.

In one embodiment, any of the L multicarrier symbol(s) is a Frequency Division Multiple Access (FDMA) symbol.

In one embodiment, any of the L multicarrier symbol(s) is an Orthogonal Frequency Division Multiplexing (OFDM) symbol.

In one embodiment, any of the L multicarrier symbol(s) is a Single-Carrier Frequency Division Multiple Access (SC-FDMA) symbol.

In one embodiment, any of the L multicarrier symbol(s) is a Discrete Fourier Transform Spread Orthogonal Frequency Division Multiplexing (DFT-S-OFDM) symbol.

In one embodiment, any of the L multicarrier symbol(s) is a Filter Bank Multi-Carrier (FBMC) symbol.

In one embodiment, any of the L multicarrier symbol(s) is an Interleaved Frequency Division Multiple Access (IF-DMA) symbol.

In one embodiment, the time domain resource unit comprises a positive integer number of radio frame(s).

In one embodiment, the time domain resource unit comprises a positive integer number of subframe(s).

In one embodiment, the time domain resource unit comprises a positive integer number of slot(s).

In one embodiment, the time domain resource unit is a slot.

In one embodiment, the time domain resource unit comprises a positive integer number of multicarrier symbol(s).

In one embodiment, the frequency domain resource unit comprises a positive integer number of carrier(s).

In one embodiment, the frequency domain resource unit comprises a positive integer number of Bandwidth Part(s) (BWP).

In one embodiment, the frequency domain resource unit is a BWP.

In one embodiment, the frequency domain resource unit comprises a positive integer number of subchannel(s).

In one embodiment, the frequency domain resource unit is a subchannel.

In one embodiment, any of the positive integer number of subchannel(s) comprises a positive integer number of Resource Block(s) (RB).

In one embodiment, the subchannel comprises a positive integer number of RB(s).

In one embodiment, any RB of the positive integer number of RB(s) comprises a positive integer number of subcarrier(s) in frequency domain.

In one embodiment, any RB of the positive integer number of RB(s) comprises a12 subcarrier(s) in frequency domain.

In one embodiment, the subchannel comprises a positive integer number of PRB(s).

In one embodiment, a number of PRB(s) comprised in the subchannel is variable.

In one embodiment, any PRB of the positive integer number of RB(s) comprises a positive integer number of subcarrier(s) in frequency domain.

In one embodiment, any PRB of the positive integer number of RB(s) comprises a12 subcarrier(s) in frequency domain.

In one embodiment, the frequency domain resource unit comprises a positive integer number of RB(s).

In one embodiment, the frequency domain resource unit is an RB.

In one embodiment, the frequency domain resource unit comprises a positive integer number of PRB(s).

In one embodiment, the frequency domain resource unit is a PRB.

In one embodiment, the frequency domain resource unit comprises a positive integer number of subcarrier(s).

In one embodiment, the frequency domain resource unit is a subcarrier.

In one embodiment, the time-frequency resource unit comprises the time domain resource unit.

In one embodiment, the time-frequency resource unit comprises the frequency domain resource unit.

In one embodiment, the time-frequency resource unit comprises the time domain resource unit and the frequency domain resource unit.

In one embodiment, the time-frequency resource unit comprises R RE(s), R being a positive integer.

In one embodiment, the time-frequency resource unit is composed of R RE(s), R being a positive integer.

In one embodiment, any of the R RE(s) occupies a multicarrier symbol in time domain, and occupies a subcarrier in frequency domain.

In one embodiment, the SCS is measured by Hz.

In one embodiment, the SCS is measured by kHz.

In one embodiment, the SCS is measured by MHz.

In one embodiment, the symbolic length of the multicarrier symbol is measured by sampling point.

In one embodiment, the symbolic length of the multicarrier symbol is measured by μs.

In one embodiment, the symbolic length of the multicarrier symbol is measured by ms.

In one embodiment, the SCS at least is one of 1.25 kHz, 2.5 kHz, 5 kHz, 15 kHz, 30 kHz, 60 kHz, 120 kHz and 240 kHz.

In one embodiment, the time-frequency resource unit comprises the K subcarrier(s) and the L multicarrier symbol(s); a product of the K and the L is no less than the R.

In one embodiment, the time-frequency resource unit does not comprise any RE allocated to Guard Period (GP).

In one embodiment, the time-frequency resource unit does not comprise any RE allocated to Reference Signal (RS).

In one embodiment, the time-frequency resource unit comprises a positive integer number of RB(s).

In one embodiment, the time-frequency resource unit belongs to one RB.

In one embodiment, the time-frequency resource unit is equivalent to one RB in frequency domain.

In one embodiment, the time-frequency resource unit comprises 6 RBs in frequency domain.

In one embodiment, the time-frequency resource unit comprises 20 RBs in frequency domain.

In one embodiment, the time-frequency resource unit comprises a positive integer number of PRB(s).

In one embodiment, the time-frequency resource unit belongs to one PRB.

In one embodiment, the time-frequency resource unit is equivalent to one PRB in frequency domain.

In one embodiment, the time-frequency resource unit comprises a positive integer number of Virtual Resource Block(s) (VRB).

In one embodiment, the time-frequency resource unit belongs to one VRB.

In one embodiment, the time-frequency resource unit is equivalent to one VRB in frequency domain.

In one embodiment, the time-frequency resource unit comprises a positive integer number of PRB pair(s).

In one embodiment, the time-frequency resource unit belongs to one PRB pair.

In one embodiment, the time-frequency resource unit is equivalent to one PRB pair in frequency domain.

In one embodiment, the time-frequency resource unit comprises a positive integer number of radio frame(s).

In one embodiment, the time-frequency resource unit belongs to one radio frame.

In one embodiment, the time-frequency resource unit is equivalent to one radio frame in time domain.

In one embodiment, the time-frequency resource unit comprises a positive integer number of subframe(s).

In one embodiment, the time-frequency resource unit belongs to one subframe.

In one embodiment, the time-frequency resource unit is equivalent to one subframe in time domain.

In one embodiment, the time-frequency resource unit comprises a positive integer number of slot(s).

In one embodiment, the time-frequency resource unit belongs to one slot.

In one embodiment, the time-frequency resource unit is equivalent to one slot in time domain.

In one embodiment, the time-frequency resource unit comprises a positive integer number of symbol(s).

In one embodiment, the time-frequency resource unit belongs to one symbol.

In one embodiment, the time-frequency resource unit is equivalent to one symbol in time domain.

In one embodiment, duration time of the time domain resource unit in the present disclosure is equal to duration time of the time-frequency resource unit in the present disclosure in time domain.

In one embodiment, a number of subcarriers occupied by the frequency domain resource unit in the present disclosure is equal to a number of subcarriers occupied by the time-frequency resource unit in the present disclosure in frequency domain.

Embodiment 13

Figure 13:
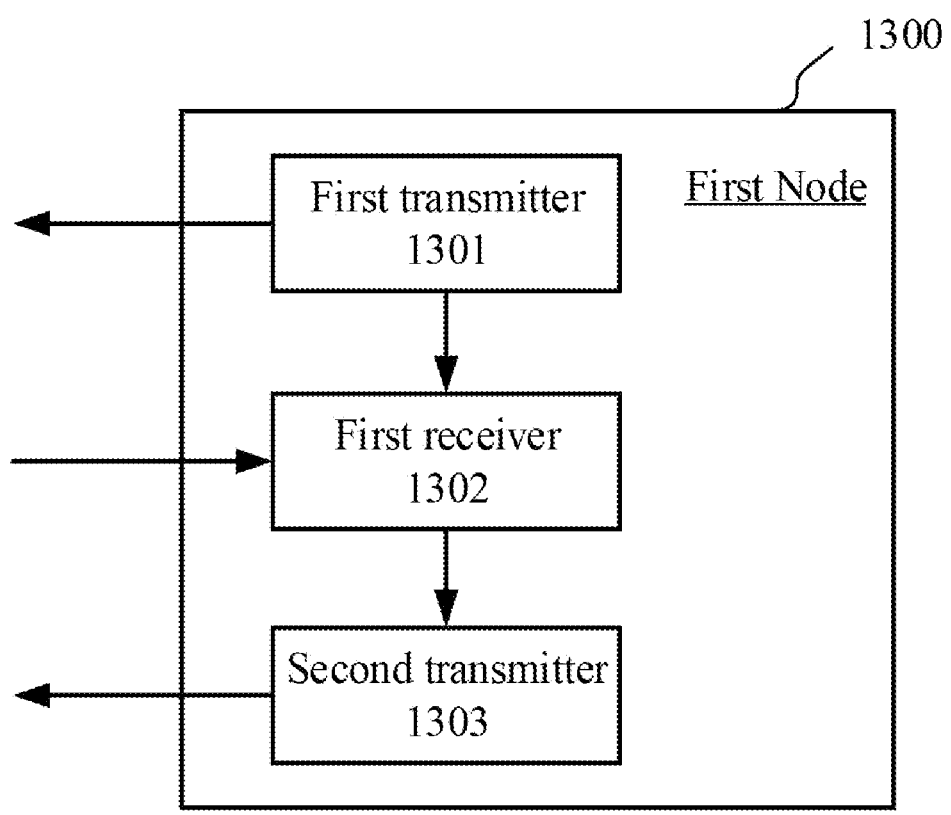
FIG. 13 illustrates a structure block diagram of a processing device in a first node according to one embodiment of the present disclosure.

Embodiment 13 illustrates a structure block diagram of a processing device in a first node, as shown in FIG. 13. In Embodiment 13, a first node processing device 1300 mainly consists of a first transmitter 1301, a first receiver 1302 and a second transmitter 1303.

In one embodiment, the first transmitter 1301 comprises at least one of the antenna 452, the transmitter/receiver 454, the multi-antenna transmitting processor 457, the transmitting processor 468, the controller/processor 459, the memory 460 or the data source 467 in FIG. 4 of the present disclosure.

In one embodiment, the first receiver 1302 comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In one embodiment, the second transmitter 1303 comprises at least one of the antenna 452, the transmitter/receiver 454, the multi-antenna transmitting processor 457, the transmitting processor 468, the controller/processor 459, the memory 460 or the data source 467 in FIG. 4 of the present disclosure.

In Embodiment 13, the first transmitter 1301 transmits a first sequence and a first radio signal, the first sequence being associated with the first radio signal, the first sequence being transmitted on a first random-access channel, and a first bit block being used for generating the first radio signal; the first receiver 1302 receives a second radio signal, the second radio signal comprising a first information block; the second transmitter 1303 transmits a second sequence and a third radio signal, the second sequence being associated with the third radio signal, the second sequence being transmitted on a second random-access channel, and the first bit block being used for generating the third radio signal; the first radio signal is used for carrying a first identification; the first information block is used for triggering a transmission of the third radio signal; the first information block comprises a first sequence index, the first sequence index corresponding to the first sequence; the first information block is used for determining transmission parameters of the third radio signal.

In one embodiment, the first information block comprises Q first-type response signaling(s), a first response signaling is one of the Q first-type response signaling(s), the first response signaling corresponds to the first sequence, and the first response signaling is used for determining that the first bit block is not correctly decoded, Q is a positive integer.

In one embodiment, the first information block comprises a first target signaling, the first target signaling corresponds to the first sequence, the first target signaling is used for determining that the first bit block is not correctly decoded, a target receiver of the first information block is the first node.

In one embodiment, the first receiver 1302 performs a first blind detection and a second blind detection respectively on a first candidate channel and a second candidate channel; the first radio signal is used for triggering the first blind detection and the second blind detection; the second radio signal is detected on the first candidate channel.

In one embodiment, the first receiver 1302 receives a first signaling in a first time window; a time domain resource unit occupied by the first candidate channel and a time domain resource unit occupied by the second candidate channel belong to the first time window; at least one of a time-frequency resource unit occupied by the first sequence and a time-frequency resource unit occupied by the first radio signal is used for determining the first time window; the first signaling is used for determining scheduling information of the second radio signal.

In one embodiment, the first node processing device 1300 is a UE.

In one embodiment, the first node processing device 1300 is a relay node.

Embodiment 14

Figure 14:
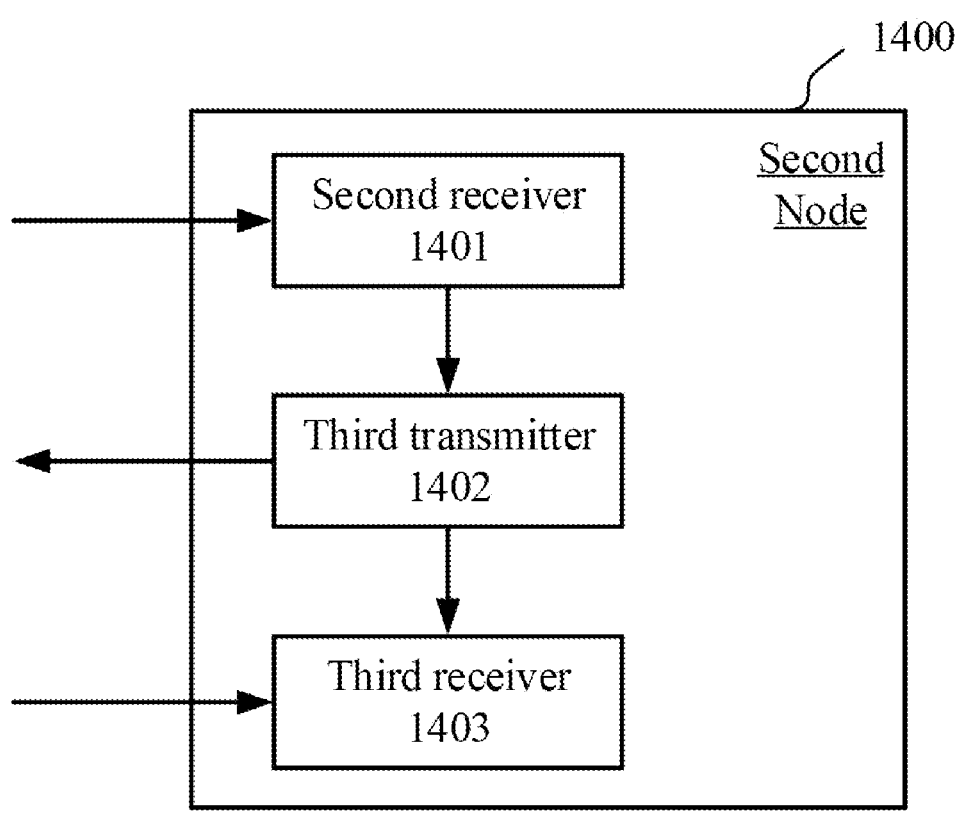
FIG. 14 illustrates a structure block diagram of a processing device in a second node according to one embodiment of the present disclosure.

Embodiment 14 illustrates a structure block diagram of a processing device in a second node, as shown in FIG. 14. In FIG. 14, a second node processing device 1400 mainly consists of a second receiver 1401, a third transmitter 1402 and a third receiver 1403.

In one embodiment, the second receiver 1401 comprises at least one of the antenna 420, the transmitter/receiver 418, the multi-antenna receiving processor 472, the receiving processor 470, the controller/processor 475 or the memory 476 in FIG. 4 of the present disclosure.

In one embodiment, the third transmitter 1402 comprises at least one of the antenna 420, the transmitter/receiver 418, the multi-antenna transmitting processor 471, the transmitting processor 416, the controller/processor 475 or the memory 476 in FIG. 4 of the present disclosure.

In one embodiment, the third receiver 1403 comprises at least one of the antenna 420, the transmitter/receiver 418, the multi-antenna receiving processor 472, the receiving processor 470, the controller/processor 475 or the memory 476 in FIG. 4 of the present disclosure.

In Embodiment 14, the second receiver 1401 receives a first sequence and a first radio signal, the first sequence being associated with the first radio signal, the first sequence being transmitted on a first random-access channel, and a first bit block being used for generating the first radio signal; the third transmitter 1402 transmits a second radio signal, the second radio signal comprising a first information block; the third receiver 1403 receives a second sequence and a third radio signal, the second sequence being associated with the third radio signal, the second sequence being transmitted on a second random-access channel, and the first bit block being used for generating the third radio signal; the first radio signal is used for carrying a first identification; the first information block is used for triggering a transmission of the third radio signal; the first information block comprises a first sequence index, the first sequence index corresponding to the first sequence; the first information block is used for determining transmission parameters of the third radio signal.

In one embodiment, the first information block comprises Q first-type response signaling(s), a first response signaling is one of the Q first-type response signaling(s), the first response signaling corresponds to the first sequence, and the first response signaling is used for determining that the first bit block is not correctly decoded, Q is a positive integer.

In one embodiment, the first information block comprises a first target signaling, the first target signaling corresponds to the first sequence, the first target signaling is used for determining that the first bit block is not correctly decoded, a target receiver of the first information block is the first node.

In one embodiment, the third transmitter 1402 determines a first candidate channel between a first candidate channel and a second candidate channel; a result of detection on the first radio signal is used for determining the first candidate channel; the second radio signal is transmitted on the first candidate channel.

In one embodiment, the third transmitter 1402 transmits a first signaling in a first time window; a time domain resource unit occupied by the first candidate channel and a time domain resource unit occupied by the second candidate channel belong to the first time window; at least one of a time-frequency resource unit occupied by the first sequence and a time-frequency resource unit occupied by the first radio signal is used for determining the first time window; the first signaling is used for determining scheduling information of the second radio signal.

In one embodiment, the second node processing device 1400 is a UE.

In one embodiment, the second node processing device 1400 is a relay node.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node in the present disclosure includes but is not limited to mobile phones, tablet computers, notebooks, network cards, low-consumption equipment, enhanced MTC (eMTC) equipment, NB-IOT terminals, vehicle-mounted equipment, aircrafts, airplanes, unmanned aerial vehicles, telecontrolled aircrafts, etc. The second node in the present disclosure includes but is not limited to mobile phones, tablet computers, notebooks, network cards, low-consumption equipment, enhanced MTC (eMTC) equipment, NB-IOT terminals, vehicle-mounted equipment, aircrafts, airplanes, unmanned aerial vehicles, telecontrolled aircrafts, etc. The UE or terminal in the present disclosure includes but is not limited to mobile phones, tablet computers, notebooks, network cards, low-consumption equipment, enhanced MTC (eMTC) equipment, NB-IOT terminals, vehicle-mounted equipment, aircrafts, airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base station, aerial base station, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

The invention claimed is:

1. A method in a first node for wireless communication, comprising:
   transmitting a first sequence and a first radio signal, the first sequence being associated with the first radio signal, the first sequence is used for determining a time-frequency resource unit occupied by the first radio signal, the first sequence is used for determining a scrambling sequence of the first radio signal; the first sequence being transmitted on a first random-access channel, and a first bit block being used for generating the first radio signal; the first sequence is a random access preamble; the first random-access channel is a PRACH (Physical Random Access Channel) occasion; the first radio signal is transmitted on a PUSCH (Physical Uplink Shared Channel);
   receiving a second radio signal, the second radio signal comprising a first information block; the second radio signal comprises one or more fields of an RRC (Radio Resource Control) IE (Information Element); and
   transmitting a second sequence and a third radio signal, the second sequence being associated with the third radio signal, the second sequence is used for determining a time-frequency resource unit occupied by the third radio signal, the second sequence is used for determining a scrambling sequence of the third radio signal; the second sequence being transmitted on a second random-access channel, and the first bit block being used for generating the third radio signal; the second sequence is a random access preamble; the second random-access channel is a PRACH occasion; the third radio signal is transmitted on a PUSCH;
   wherein the first radio signal comprises a first identification, the first identification is used for determining the time-frequency resource unit occupied by the first radio signal; the first information block is used for triggering a transmission of the third radio signal; the first information block comprises a first sequence index, the first sequence index corresponds to the first sequence; the first information block is used for determining transmission parameters of the third radio signal.

2. The method according to claim 1, wherein the first information block comprises Q first-type response signaling, a first response signaling is one of the Q first-type response signaling, the first response signaling corresponds to the first sequence, and the first response signaling is used for determining that the first bit block is not correctly decoded, Q is a positive integer.

3. The method according to claim 1, wherein the first information block comprises a first target signaling, the first target signaling corresponds to the first sequence, the first target signaling is used for determining that the first bit block is not correctly decoded, a target receiver of the first information block is the first node.

4. The method according to claim 1, comprising: performing a first blind detection and a second blind detection respectively on a first candidate channel and a second candidate channel; wherein the first radio signal is used for triggering the first blind detection and the second blind detection; the second radio signal is detected on the first candidate channel.

5. The method according to claim 4, comprising: receiving a first signaling in a first time window; wherein a time domain resource unit occupied by the first candidate channel and a time domain resource unit occupied by the second candidate channel both belong to the first time window; at least one of a time-frequency resource unit occupied by the first sequence and a time-frequency resource unit occupied by the first radio signal is used for determining the first time window; the first signaling is used for determining scheduling information of the second radio signal.

6. A method in a second node for wireless communication, comprising:
receiving a first sequence and a first radio signal, the first sequence being associated with the first radio signal, the first sequence is used for determining a time-frequency resource unit occupied by the first radio signal, the first sequence is used for determining a scrambling sequence of the first radio signal; the first sequence being transmitted on a first random-access channel, and a first bit block being used for generating the first radio signal; the first sequence is a random access preamble; the first random-access channel is a PRACH (Physical Random Access Channel) occasion; the first radio signal is transmitted on a PUSCH (Physical Uplink Shared Channel);
transmitting a second radio signal, the second radio signal comprising a first information block; the second radio signal comprises one or more fields of an RRC (Radio Resource Control) IE (Information Element); and
receiving a second sequence and a third radio signal, the second sequence being associated with the third radio signal, the second sequence is used for determining a time-frequency resource unit occupied by the third radio signal, the second sequence is used for determining a scrambling sequence of the third radio signal; the second sequence being transmitted on a second random-access channel, and the first bit block being used for generating the third radio signal; the second sequence is a random access preamble; the second random-access channel is a PRACH occasion; the third radio signal is transmitted on a PUSCH;
wherein the first radio signal comprises a first identification, the first identification is used for determining the time-frequency resource unit occupied by the first radio signal; the first information block is used for triggering a transmission of the third radio signal; the first information block comprises a first sequence index, the first sequence index corresponds to the first sequence; the first information block is used for determining transmission parameters of the third radio signal.

7. The method according to claim 6, wherein the first information block comprises Q first-type response signaling, a first response signaling is one of the Q first-type response signaling, the first response signaling corresponds to the first sequence, and the first response signaling is used for determining that the first bit block is not correctly decoded, Q is a positive integer.

8. The method according to claim 6, wherein the first information block comprises a first target signaling, the first target signaling corresponds to the first sequence, the first target signaling is used for determining that the first bit block is not correctly decoded, a target receiver of the first information block is a first node.

9. The method according to claim 6, comprising:
determining a first candidate channel out of the first candidate channel and a second candidate channel;
wherein a result of detection of the first radio signal is used for determining the first candidate channel; the second radio signal is transmitted on the first candidate channel.

10. The method according to claim 9, comprising: transmitting a first signaling in first time window; wherein a time domain resource unit occupied by the first candidate channel and a time domain resource unit occupied by the second candidate channel both belong to the first time window; at least one of a time-frequency resource unit occupied by the first sequence and a time-frequency resource unit occupied by the first radio signal is used for determining the first time window; the first signaling is used for determining scheduling information of the second radio signal.

11. A first node for wireless communication, comprising:
a first transmitter, which transmits a first sequence and a first radio signal, the first sequence being associated with the first radio signal, the first sequence is used for determining a time-frequency resource unit occupied by the first radio signal, the first sequence is used for determining a scrambling sequence of the first radio signal; the first sequence being transmitted on a first random-access channel, and a first bit block being use for generating the first radio signal; the first sequence is a random access preamble; the first random-access channel is a PRACH (Physical Random Access Channel) occasion; the first radio signal is transmitted on a PUSCH (Physical Uplink Shared Channel);
a first receiver, which receives a second radio signal, the second radio signal comprising a first information block; the second radio signal comprises one or more fields of an RRC (Radio Resource Control) IE (Information Element); and
a second transmitter, which transmits a second sequence and a third radio signal, the second sequence being associated with the third radio signal, the second sequence is used for determining a time-frequency resource unit occupied by the third radio signal, the second sequence is used for determining a scrambling sequence of the third radio signal; the second sequence being transmitted on a second random-access channel, and the first bit block being used for generating the third radio signal; the second sequence is a random access preamble; the second random-access channel is a PRACH occasion; the third radio signal is transmitted on a PUSCH;
wherein the first radio signal comprises a first identification, the first identification is used for determining the time-frequency resource unit occupied by the first radio signal; the first information block is used for triggering a transmission of the third radio signal; the first information block comprises a first sequence index, the first sequence index corresponds to the first sequence; the first information block is used for determining transmission parameters of the third radio signal.

12. The first node according to claim 11, wherein the first information block comprises Q first-type response signaling, a first response signaling is one of the Q first-type response signaling, the first response signaling corresponds to the first sequence, and the first response signaling is used for determining that the first bit block is not correctly decoded, Q is a positive integer.

13. The first node according to claim 11, wherein the first information block comprises a first target signaling, the first target signaling corresponds to the first sequence, the first target signaling is used for determining that the first bit block is not correctly decoded, a target receiver of the first information block is the first node.

14. The first node according to claim 11, comprising:
the first receiver performing a first blind detection and a second blind detection respectively on a first candidate channel and a second candidate channel;
wherein the first radio signal is used for triggering the first blind detection and the second blind detection; the second radio signal is detected on the first candidate channel.

15. The first node according to claim 14, comprising: the first receiver receiving a first signaling in a first time window,
wherein a time domain resource unit occupied by the first candidate channel and a time domain resource unit occupied by the second candidate channel both belong to the first time window; at least one of a time-frequency resource unit occupied by the first sequence and a time-frequency resource unit occupied by the first radio signal is used for determining the first time window; the first signaling is used for determining scheduling information of the second radio signal.

16. A second node for wireless communication, comprising:
a second receiver, which receives a first sequence and a first radio signal, the first sequence being associated with the first radio signal, the first sequence is used for determining a time-frequency resource unit occupied by the first radio signal, the first sequence is used for determining a scrambling sequence of the first radio signal; the first sequence being transmitted on a first random-access channel, and a first bit block being used for generating the first radio signal; the first sequence is a random access preamble; the first random-access channel is a PRACH (Physical Random Access Channel) occasion; the first radio signal is transmitted on a PUSCH (Physical Uplink Shared Channel);
a third transmitter, which transmits a second radio signal, the second radio signal comprising a first information block; the second radio signal comprises one or more fields of an RRC (Radio Resource Control) IE (Information Element); and
a third receiver, which receives a second sequence and a third radio signal, the second sequence being associated with the third radio signal, the second sequence is used for determining a time-frequency resource unit occupied by the third radio signal, the second sequence is used for determining a scrambling sequence of the third radio signal; the second sequence being transmitted on a second random-access channel, and the first bit block being used for generating the third radio signal; the second sequence is a random access preamble; the second random-access channel is a PRACH occasion; the third radio signal is transmitted on a PUSCH;
wherein the first radio signal comprises a first identification, the first identification is used for determining the time-frequency resource unit occupied by the first radio signal; the first information block is used for triggering a transmission of the third radio signal; the first information block comprises a first sequence index, the first sequence index corresponds to the first sequence; the first information block is used for determining transmission parameters of the third radio signal.

17. The second node according to claim 16, wherein the first information block comprises Q first-type response signaling, a first response signaling is one of the Q first-type response signaling, the first response signaling corresponds to the first sequence, and the first response signaling is used for determining that the first bit block is not correctly decoded, Q is a positive integer.

18. The second node according to claim 16, wherein the first information block comprises a first target signaling, the first target signaling corresponds to the first sequence, the first target signaling is used for determining that the first bit block is not correctly decoded, a target receiver of the first information block is a first node.

19. The second node according to claim 16, comprising:
the third transmitter determining a first candidate channel out of the first candidate channel and a second candidate channel; wherein a result of detection of the first radio signal is used for determining the first candidate channel; the second radio signal is transmitted on the first candidate channel.

20. The second node according to claim 19, comprising:
the third transmitter transmitting a first signaling in a first time window;
wherein a time domain resource unit occupied by the first candidate channel and a time domain resource unit occupied by the second candidate channel both belong to the first time window; at least one of a time-frequency resource unit occupied by the first sequence and a time-frequency resource unit occupied by the first radio signal is used for determining the first time window; the first signaling is used for determining scheduling information of the second radio signal.

* * * * *